(12) United States Patent
Magerkurth et al.

(10) Patent No.: US 11,599,653 B1
(45) Date of Patent: *Mar. 7, 2023

(54) SYSTEMS AND METHODS FOR CONTROLLED ACCESS TO POLICY DATA ON BLOCKCHAIN

(71) Applicant: STATE FARM MUTUAL AUTOMOBILE INSURANCE COMPANY, Bloomington, IL (US)

(72) Inventors: Melinda Teresa Magerkurth, Utica, IL (US); Eric Bellas, Bloomington, IL (US); Jaime Skaggs, Chenoa, IL (US); Shawn M. Call, Bloomington, IL (US); Eric R. Moore, Heyworth, IL (US); Vicki King, Bloomington, IL (US); Burton J. Floyd, Mackinaw, IL (US); David Turrentine, Normal, IL (US); Steven T. Olson, Bloomington, IL (US); Timothy Caleb Wells, Bloomington, IL (US); Corin Rebekah Chapman, Bloomington, IL (US); Edward W. Breitweiser, Bloomington, IL (US); Robert Gomez, Bloomington, IL (US); Shelia Cummings Smith, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 316 days.

This patent is subject to a terminal disclaimer.

(21) Appl. No.: 16/916,398

(22) Filed: Jun. 30, 2020

Related U.S. Application Data

(63) Continuation of application No. 15/876,953, filed on Jan. 22, 2018, now Pat. No. 10,824,747.

(Continued)

(51) Int. Cl.
*G06F 21/62* (2013.01)
*G06F 21/60* (2013.01)
(Continued)

(52) U.S. Cl.
CPC ........ *G06F 21/6209* (2013.01); *G06F 21/602* (2013.01); *G06F 21/604* (2013.01);
(Continued)

(58) Field of Classification Search
CPC . G06F 21/6209; H04L 9/0861; H04L 67/104; H04L 63/0428; H04L 9/0894; H04L 9/0637
(Continued)

(56) References Cited

U.S. PATENT DOCUMENTS 7,054,833 B1    5/2006    McDonald
7,747,592 B2    6/2010    Thomas
(Continued)

FOREIGN PATENT DOCUMENTS

CN           113761057 A     12/2021
WO    WO-2018019364 A1 *   2/2018 ............. G06F 21/62
(Continued)

OTHER PUBLICATIONS

Chen et al., "Blockchain-based payment collection supervision system using pervasive Bitcoin digital wallet", 2017 IEEE 13th International Conference on Wireless and Mobile Computing, Networking and Communications (WiMob) (Year: 2017).

(Continued)

*Primary Examiner* — Badri Narayanan Champakesan
(74) *Attorney, Agent, or Firm* — Marshall, Gerstein & Borun LLP

(57) ABSTRACT

Methods and systems for managing and/or processing a blockchain to maintain data security for confidential and/or personal data are provided. According to certain aspects, the (Continued)

disclosed data security techniques may enable access sharing functionality utilizing the blockchain. For example, access sharing may be utilized to share policy information. The policy information may be associated with a smart contract. Accordingly, the policy information may be encrypted using a public key for the smart contract and compiled into a block of the blockchain. In response to a request to provide access to the information to a particular node, the private key for the smart contract may be encrypted using the public key for the particular node and compiled into a block of the blockchain.

17 Claims, 19 Drawing Sheets

Related U.S. Application Data

(60) Provisional application No. 62/536,698, filed on Jul. 25, 2017, provisional application No. 62/536,704, filed on Jul. 25, 2017, provisional application No. 62/536,600, filed on Jul. 25, 2017, provisional application No. 62/536,709, filed on Jul. 25, 2017, provisional application No. 62/536,672, filed on Jul. 25, 2017, provisional application No. 62/536,716, filed on Jul. 25, 2017, provisional application No. 62/536,715, filed on Jul. 25, 2017, provisional application No. 62/536,754, filed on Jul. 25, 2017, provisional application No. 62/536,735, filed on Jul. 25, 2017, provisional application No. 62/536,683, filed on Jul. 25, 2017, provisional application No. 62/450,349, filed on Jan. 25, 2017.

(51) Int. Cl.
*H04L 29/08* (2006.01)
*H04L 9/08* (2006.01)
*H04L 9/06* (2006.01)
*H04L 9/32* (2006.01)
*H04L 67/104* (2022.01)

(52) U.S. Cl.
CPC .......... *H04L 9/0637* (2013.01); *H04L 9/0861* (2013.01); *H04L 9/3247* (2013.01); *H04L 67/104* (2013.01)

(58) Field of Classification Search
USPC .......................................................... 713/193
See application file for complete search history.

(56) References Cited

U.S. PATENT DOCUMENTS

| | | | |
|---|---|---|---|
| 10,063,529 B2 | 8/2018 | Milazzo et al. | |
| 10,366,204 B2 | 7/2019 | Tanner, Jr. et al. | |
| 10,454,878 B2 | 10/2019 | Khan et al. | |
| 10,521,780 B1 | 12/2019 | Hopkins, III et al. | |
| 10,586,062 B1 | 3/2020 | Hopkins et al. | |
| 10,606,669 B2 | 3/2020 | Jacobs et al. | |
| 10,740,849 B1 | 8/2020 | Leise et al. | |
| 10,796,393 B2 | 10/2020 | Messerges et al. | |
| 10,805,085 B1 | 10/2020 | Liang | |
| 10,824,759 B1 | 11/2020 | Magerkurth et al. | |
| 10,833,843 B1 | 11/2020 | Vijayvergia et al. | |
| 10,872,381 B1 | 12/2020 | Leise et al. | |
| 10,878,512 B1 | 12/2020 | Al-Zoubi et al. | |
| 10,891,694 B1 | 1/2021 | Leise et al. | |
| 10,956,614 B2 | 3/2021 | Daniel et al. | |
| 2003/0115073 A1 | 6/2003 | Todd et al. | |
| 2009/0055230 A1 | 2/2009 | Ellrod | |
| 2009/0063556 A1 | 3/2009 | Nemoto et al. | |
| 2009/0089413 A1 | 4/2009 | Kamei et al. | |
| 2012/0123942 A1 | 5/2012 | Song et al. | |
| 2013/0085825 A1 | 4/2013 | Davis et al. | |
| 2013/0097092 A1 | 4/2013 | Tully et al. | |
| 2015/0199779 A1 | 7/2015 | Lundberg | |
| 2016/0162897 A1 | 6/2016 | Feeney | |
| 2016/0241545 A1 | 8/2016 | Gregg et al. | |
| 2016/0330031 A1 | 11/2016 | Drego et al. | |
| 2017/0032482 A1 | 2/2017 | Whitmyer, Jr. | |
| 2017/0046664 A1 | 2/2017 | Haldenby et al. | |
| 2017/0046689 A1 | 2/2017 | Lohe et al. | |
| 2017/0046693 A1 | 2/2017 | Haldenby et al. | |
| 2017/0046806 A1* | 2/2017 | Haldenby | G06Q 20/367 |
| 2017/0054611 A1 | 2/2017 | Tiell | |
| 2017/0116693 A1 | 4/2017 | Rae et al. | |
| 2017/0161991 A1 | 6/2017 | Ayati et al. | |
| 2017/0206522 A1* | 7/2017 | Schiatti | G06Q 30/00 |
| 2017/0207917 A1* | 7/2017 | Davis | H04L 9/3066 |
| 2017/0230353 A1 | 8/2017 | Kurian et al. | |
| 2017/0230375 A1 | 8/2017 | Kurian | |
| 2017/0237554 A1 | 8/2017 | Jacobs et al. | |
| 2017/0237570 A1 | 8/2017 | Vandervort | |
| 2017/0262819 A1 | 9/2017 | Malhotra et al. | |
| 2017/0279774 A1 | 9/2017 | Booz et al. | |
| 2017/0286717 A1 | 10/2017 | Khi et al. | |
| 2017/0289111 A1* | 10/2017 | Voell | H04L 63/0435 |
| 2017/0300627 A1* | 10/2017 | Giordano | G16H 10/60 |
| 2017/0323392 A1 | 11/2017 | Kasper et al. | |
| 2017/0344987 A1 | 11/2017 | Davis | |
| 2017/0344988 A1* | 11/2017 | Cusden | H04L 9/3247 |
| 2017/0345011 A1 | 11/2017 | Salami et al. | |
| 2017/0346693 A1 | 11/2017 | Dix et al. | |
| 2018/0046992 A1 | 2/2018 | Hanrahan et al. | |
| 2018/0068130 A1 | 3/2018 | Chan et al. | |
| 2018/0114205 A1 | 4/2018 | Thomas et al. | |
| 2018/0137506 A1* | 5/2018 | Kcl | G06Q 20/401 |
| 2018/0144153 A1* | 5/2018 | Pead | H04L 9/3236 |
| 2018/0158034 A1* | 6/2018 | Hunt | G06Q 20/027 |
| 2018/0165588 A1 | 6/2018 | Saxena et al. | |
| 2018/0165724 A1 | 6/2018 | Rakshit et al. | |
| 2018/0181768 A1 | 6/2018 | Leporini et al. | |
| 2018/0183600 A1* | 6/2018 | Davis | H04L 9/3239 |
| 2018/0204191 A1 | 7/2018 | Wilson et al. | |
| 2018/0205555 A1* | 7/2018 | Watanabe | G06Q 10/06 |
| 2018/0211213 A1 | 7/2018 | Vivier | |
| 2018/0218455 A1 | 8/2018 | Kolb et al. | |
| 2018/0225611 A1 | 8/2018 | Daniel et al. | |
| 2018/0264347 A1* | 9/2018 | Tran | A63B 24/0006 |
| 2018/0276270 A1 | 9/2018 | Bisbee et al. | |
| 2018/0285879 A1* | 10/2018 | Gadnis | G06Q 20/385 |
| 2018/0314809 A1* | 11/2018 | Mintz | H04L 9/0637 |
| 2018/0341648 A1* | 11/2018 | Kakavand | H04L 29/06 |
| 2018/0343114 A1* | 11/2018 | Ben-Ari | H04L 9/0825 |
| 2019/0019183 A1 | 1/2019 | Karame et al. | |
| 2019/0019186 A1 | 1/2019 | Falah et al. | |
| 2019/0043048 A1 | 2/2019 | Wright et al. | |
| 2019/0173667 A1 | 6/2019 | Wang et al. | |
| 2019/0180266 A1* | 6/2019 | Sidhu | H04L 63/102 |
| 2019/0197620 A1 | 6/2019 | Jayaram et al. | |
| 2019/0244227 A1 | 8/2019 | Inoue | |
| 2019/0342078 A1* | 11/2019 | Li | G06F 21/64 |
| 2019/0354966 A1 | 11/2019 | Himura et al. | |
| 2019/0384892 A1 | 12/2019 | Holland et al. | |
| 2019/0392437 A1 | 12/2019 | Castagna et al. | |
| 2019/0392438 A1 | 12/2019 | Rice | |
| 2020/0005254 A1* | 1/2020 | Wright | H04L 9/14 |
| 2020/0058071 A1 | 2/2020 | Yang | |
| 2020/0065763 A1 | 2/2020 | Rosinzonsky et al. | |
| 2020/0117793 A1 | 4/2020 | Simpson et al. | |
| 2020/0177373 A1 | 6/2020 | Komandur et al. | |
| 2020/0226677 A1 | 7/2020 | Dhawan et al. | |
| 2020/0250753 A1 | 8/2020 | Blount | |
| 2020/0272966 A1 | 8/2020 | Kirkegaard | |
| 2020/0279328 A1 | 9/2020 | Zhiri et al. | |
| 2020/0341971 A1 | 10/2020 | Krishnaswamy et al. | |
| 2020/0394321 A1 | 12/2020 | Ramos et al. | |
| 2020/0394322 A1 | 12/2020 | Ramos et al. | |
| 2020/0409937 A1 | 12/2020 | Wang et al. | |

(56) References Cited

U.S. PATENT DOCUMENTS

| | | |
|---|---|---|
| 2021/0065293 A1 | 3/2021 | Sigler et al. |
| 2021/0090037 A1 | 3/2021 | Dowding |
| 2021/0174442 A1 | 6/2021 | Trudeau et al. |

FOREIGN PATENT DOCUMENTS

| | | | | |
|---|---|---|---|---|
| WO | WO-2018058441 A1 | * | 4/2018 | ........... H04L 9/0877 |
| WO | 2021/046494 A1 | | 3/2021 | |

OTHER PUBLICATIONS

Finra, "Distributed Ledger Technology: Implications of Blockchain for the Securities Industry", Jan. 2017.

Blockchain in the insurance sector. Retrieved from the internet at: <URL: https://www.pwc.co.uk (2016).

HashCoin Uses Emercoin Blockchain For Vehicle Registration and Tracking. Retrieved from the internet at: <URL: https://cointelegraph.com/news/hashcoin-uses-emercoin-blockchain-for-vehicle-registration-and-tracking (2018).

Tim Coates, Blockchain Set to revolutionize the Insurance Sector from Within, Synechron, retrieved from https://web.archive.org/web/20161020124603/http//www.synechron.com/sites/default/files/white-paper/Thought-Leadership-on-lnsurance-Claims-Processing.pdf (2016).

Li et al., A blockchain based new secure multi-layer network model for internet of things, 2017 IEEE international congress on internet of things (ICIOT), 33-41 (2017).

* cited by examiner

SYSTEMS AND METHODS FOR CONTROLLED ACCESS TO POLICY DATA ON BLOCKCHAIN

CROSS-REFERENCE TO RELATED APPLICATIONS

This application is a continuation of U.S. application Ser. No. 15/876,953 entitled "Systems and Methods for Controlled Access to Policy Data on Blockchain," filed Jan. 22, 2018, which claims priority to and the benefit of the filing date of (1) provisional U.S. Patent Application No. 62/450,349 entitled "Systems and Methods for Securely Incorporating Blockchain Technology," filed on Jan. 25, 2017, (2) provisional U.S. Patent Application No. 62/536,600 entitled "Systems and Methods for Controlled Access to Blockchain Data," filed on Jul. 25, 2017, (3) provisional U.S. Patent Application No. 62/536,672 entitled "Systems and Methods for Controlled Access to Policy Data on Blockchain," filed on Jul. 25, 2017, (4) provisional U.S. Patent Application No. 62/62/536,683 entitled "Systems and Methods for Controlled Access to Audit Data on Blockchain," filed on Jul. 25, 2017, (5) provisional U.S. Patent Application No. 62/536,698 entitled "Systems and Methods for Securely Filing Documents via Blockchain," filed on Jul. 25, 2017, (6) provisional U.S. Patent Application No. 62/536,709 entitled "Systems and Methods for Fund Transfers via Blockchain," filed on Jul. 25, 2017, (7) provisional U.S. Patent Application No. 62/536,715 entitled "Systems and Methods for Anti-Money Laundering Compliance via Blockchain," filed on Jul. 25, 2017, (8) provisional U.S. Patent Application No. 62/536,754 entitled "Systems and Methods for Blockchain-Based Payments," filed on Jul. 25, 2017, (9) provisional U.S. Patent Application No. 62/536,735 entitled "Systems and Methods for Insurable Interest Validation via Blockchain," filed on Jul. 25, 2017, (10) provisional U.S. Patent Application No. 62/536,716 entitled "Systems and Methods for Industry Reporting via Blockchain," filed on Jul. 25, 2017, and (11) provisional U.S. Patent Application No. 62/536,704 entitled "Systems and Methods for Verifying Agent Sales Data via Blockchain," filed on Jul. 25, 2017, the entire contents of each of which is hereby expressly incorporated herein by reference.

Additionally, the present application is related to the following co-pending U.S. patent applications: (1) U.S. patent application Ser. No. 15/876,918 entitled "Systems and Methods for Controlled Access to Blockchain Data," filed Jan. 22, 2018; (2) U.S. patent application Ser. No. 15/876,953 entitled "Systems and Methods for Controlled Access to Policy Data on Blockchain," filed Jan. 22, 2018; (3) U.S. patent application Ser. No. 15/876,976 entitled "Systems and Methods for Controlled Access to Audit Data on Blockchain," filed Jan. 22, 2018; (4) U.S. patent application Ser. No. 15/877,006 entitled "Systems and Methods for Securely Filing Documents via Blockchain," filed Jan. 22, 2018; (5) U.S. patent application Ser. No. 15/877,027 entitled "Systems and Methods for Fund Transfers via Blockchain," filed Jan. 22, 2018; (6) U.S. patent application Ser. No. 15/877,046 entitled "Systems and Methods for Anti-Money Laundering Compliance via Blockchain," filed Jan. 22, 2018; (7) U.S. patent application Ser. No. 15/877,066 entitled "Systems and Methods for Blockchain-Based Payments," filed Jan. 22, 2018; (8) U.S. patent application Ser. No. 15/877,089 entitled "Systems and Methods for Insurable Interest Validation via Blockchain," filed Jan. 22, 2018; (9) U.S. patent application Ser. No. 15/877,108 entitled "Systems and Methods for Industry Reporting via Blockchain," filed Jan. 22, 2018; and (10) U.S. patent application Ser. No. 15/877,122 entitled "Systems and Methods for Verifying Agent Sales Data via Blockchain," filed Jan. 22, 2018.

TECHNICAL FIELD

The present disclosure relates to securely utilizing blockchain technology as it relates to insurance, identity, and funds management, and, in particular, ensuring that data privacy is maintained while utilizing blockchain technology.

BACKGROUND

In the world of business an interaction between a business and a customer, or the business and another business, typically requires validation of one or more pieces of information before a transaction can take place. This validation is often achieved by the participants involved in the interaction contacting a central authority that is a trusted source of truth for the particular piece of information. The central authority may then validate, or not validate, the particular piece of information and communicate its findings to the participants. Based upon the validation, or lack of validation, a consensus among the participants is formed and assuming the information is valid the transaction between the participants may take place, and subsequently be recorded.

Traditionally, businesses, customers, and central authorities have stored information related to transactions, and records of transactions, in databases, or ledgers which have been used in accounting to track transactions and information related to those transactions. Often these databases or ledgers held by the participants must be reconciled to achieve consensus as to the validity of the information stored in the databases and ledgers. Alternatively, as described above the central authority may be responsible for determining the validity of information stored in a database or a ledger and functioning as an arbiter of consensus for interested parties.

A blockchain is a new way of achieving a distributed consensus on the validity or invalidity of information. As opposed to using a central authority, a blockchain is a distributed database or ledger, in which a transactional record is maintained at each node of a peer to peer network. Commonly, the distributed ledger is comprised of groupings of transactions bundled together into a "block." When a change to the distributed ledger is made (e.g., when a new transaction and/or block is created), each node must form a consensus as to how the change is integrated into the distributed ledger. Upon consensus, the agreed upon change is pushed out to each node so that each node maintains an identical copy of the updated distributed ledger. Any change that does not achieve a consensus is ignored. Accordingly, unlike a traditional system which uses a central authority, a single party cannot unilaterally alter the distributed ledger. This inability to modify past transactions lead to blockchains being generally described as trusted, secure, and/or immutable.

Blockchains are typically deployed in an open, decentralized, and permissionless manner meaning that any party may view information, submit new information, or join the blockchain as a node responsible for confirming information. This open, decentralized, and permissionless approach to a blockchain has limitations. As an example, these traditional blockchains may not be good candidates for interactions that require information to be kept private, for interactions that require all participants to be vetted prior to their participation, or for interactions that may only be performed by a subset of all participants.

BRIEF SUMMARY

The present embodiments may be related to blockchain technology, including modifying blocking technology to be able to store confidential and/or personal information in a blockchain and maintain data privacy. The embodiments described herein relate particularly to various aspects of maintaining data security of data stored in a blockchain. In some embodiments, cryptography techniques are applied to ensure that only authorized parties are able to view the confidential and/or personal information stored in the blockchain. These data security safeguards enable participation in the blockchain by any number of nodes, regardless of their respective permissions.

In one aspect, a computer-implemented method of providing access to confidential data stored in a blockchain relating to a plurality of smart contracts may be provided. The method may include (1) detecting, by one or more processors, that a new smart contract has been created; (2) generating, by the one or more processors, a public key and a private key for the new smart contract; (3) encrypting, by the one or more processors, data associated with the new smart contract using the public key of the smart contract, the data associated with the new smart contract including information associated with a policy; (4) compiling, by the one or more processors, the data associated with the new smart contract into a first block of the blockchain; (5) distributing, by the one or more processors, the first block to a plurality of nodes to form a consensus on a first update to the blockchain; (6) detecting, by the one or more processors, a request to provide access to the data associated with the new smart contract to a particular node of the blockchain, the request indicating the particular node; (7) generating, by the one or more processors, a transaction indicating (i) the private key for the new smart contract, the private key for the new smart contract being encrypted in based upon the public key for the particular node, and/or (ii) the particular node; (8) compiling, by the one or more processors, the transaction into a second block of transactions; and/or (9) distributing, by the one or more processors, the second block to the plurality of nodes to form a consensus on a second update to the blockchain. The method may include additional, less, or alternate actions, including those discussed elsewhere herein.

For instance, in some embodiments, the information associated with the policy may include an electronic medical record, an insurance policy, a lab result, a form, and/or a confidential communication. Further, the particular node may be associated with an attorney or an estate planner. Additionally or alternatively, the first block and the second block may be the same block In some embodiments, generating the transaction may include applying, by the one or more processors, a digital signature to the transaction. The digital signature may be generated based upon the private key for a node associated with the one or more processors. Additionally or alternatively, generating the transaction may include determining, by the one or more processors, a permission level associated with the particular node; and/or generating, by the one or more processors, the transaction when the permission level indicates that the particular node is permitted to access the information associated with the policy.

In further embodiments, detecting the request to provide access to the data may include (1) receiving, at the one or more processors, the request from a requesting node; (2) determining, by the one or more processors, a permission level associated with the requesting node; and/or (3) generating, by the one or more processors, the transaction when the permission level indicates that the requesting node is permitted to request that other nodes receive access to the information associated with the policy. Additionally or alternatively, detecting the request to provide access to the data may include generating, by the one or more processors, the request to provide access to the data associated upon being directed by the new smart contract.

Systems or computer-readable media storing instructions for implementing all or part of the methods described above may also be provided in some aspects. Systems for implementing such methods may include one or more of the following: a special-purpose assessment computing device, a mobile computing device, a remote server, one or more sensors, one or more communication modules configured to communicate wirelessly via radio links, radio frequency links, and/or wireless communication channels, and/or one or more program memories coupled to one or more processors of the mobile computing device, or remote server. Such program memories may store instructions to cause the one or more processors to implement part or all of the method described above. Additional or alternative features described herein below may be included in some aspects.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF DRAWINGS

The figures described below depict various aspects of the present disclosure. It should be understood that each figure depicts an embodiment of a particular aspect of the present disclosure. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1A:
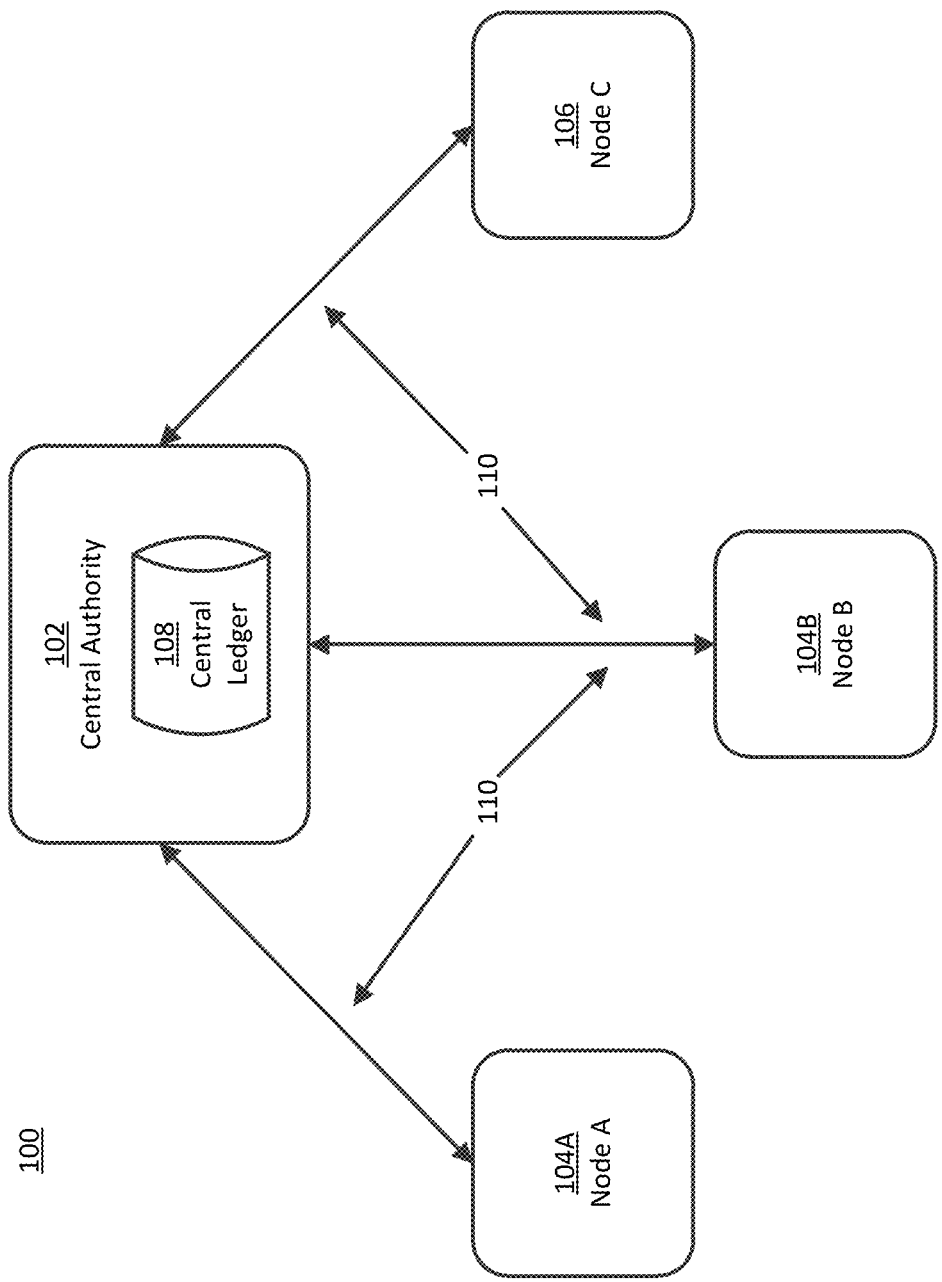
FIG. 1A depicts an exemplary database system 100 in accordance with one aspect of the present disclosure.

The figures depict aspects of the present invention for purposes of illustration only. One skilled in the art will readily recognize from the following discussion that alternate aspects of the structures and methods illustrated herein may be employed without departing from the principles of the invention described herein.

DETAILED DESCRIPTION

The present embodiments relate to, inter alia, systems and methods for using a blockchain to perform services related to banking, identity management, and insurance applications. The systems and methods described herein enable the use of blockchain technology while securely maintaining private information and permissioned participation in the blockchain. At the same time, the systems and methods still allow for a distributed consensus amongst businesses, consumers, and authorities, as to the validity of information and transactions stored on the blockchain, regardless of the permissions associated with each node.

Some exemplary, but not limiting, applications that may take advantage of the disclosed systems and methods include specific applications directed to banking, mutual funds, and insurance. These examples relate to problems surrounding money transfers, digital identities, and collective reporting. Specifically, such applications may include: identity authentication, account funding and distribution, card activation, actions trigged by death registry, using and accessing asset data lien perfection obtaining payoff values contractor ratings/reviews single view of customer's products, associate licensing, using and accessing user data, blockchain based payments, interest validation, industry reporting, agent sales data, fund transfers, unclaimed property compliance, auditing compliance, anti-money laundering compliance, policy detail delivery, and form filings.

The above listed examples, and disclosed systems and methods, may use an application of distributed ledgers, where each new block may be cryptographically linked to the previous block in order to form a "blockchain." More particularly, to create a new block, each transaction within a block may be assigned a hash value (i.e., an output of a cryptographic hash function, such as SHA-256 or MD5). These hash values may then be combined together utilizing cryptographic techniques (e.g., a Merkle Tree) to generate a hash value representative of the entire new block, and, consequently, the transactions stored in the block. This hash value may then be combined with the hash value of the previous block to form a hash value included in the header of the new block, thereby cryptographically linking the new block to the blockchain. To this end, the precise value utilized in the header of the new block is dependent on the hash value for each transaction in the new block, as well as the hash value for each transaction in every prior block.

According to certain aspects disclosed herein, the hash value generated for the new block and a nonce value (an arbitrary number used once) are used as inputs into a cryptographic puzzle that must be solved to validate the new block. In one example of a cryptographic puzzle, a solving node uses the hash value generated for the new block and repeatedly changes the value of the nonce until a solution for the puzzle is found. When a solution to the cryptographic puzzle is found, the solving node publishes the solution and the other nodes then verify that the solution is the correct solution. Because the solution also depends on the particular hash values for each transaction within the blockchain, if the solving node attempted to modify any transaction, the solution would not be verified by the other nodes.

More particularly, if a single node attempts to modify a prior transaction within the blockchain, a cascade of different hash values are generated for each tier of the cryptographic combination technique. This results in the header for one or more blocks being different than the corresponding header(s) in every other node that did not make the exact same modification. As a result, the solution generated by the modifying node would not solve the cryptographic puzzle presented to any node without the identical modification. Thus, the version of the new block generated by the modifying node is readily recognized as including an improper modification and is rejected by the consensus. This inability to modify past transactions lead to blockchains being generally described as trusted, secure, and/or immutable.

The systems and methods disclosed herein also include performing actions utilizing the distributed consensus achieved through the blockchain. In particular, these actions may be executed by smart contracts. A smart contract is a computer protocol that enables the automatic execution and/or enforcement of an agreement between different parties. The smart contract may include one or more trigger conditions, that, when satisfied, correspond to one or more actions. For some smart contracts, which action(s) from the one or more actions are performed is determined based upon one or more decision conditions. Nodes on the network may subscribe to one or more data streams including data related to a trigger condition and/or a decision condition. Accordingly, the nodes may route the data streams to the smart contract so that the smart contract may detect that a trigger condition has occurred and/or analyze a decision condition to direct nodes to perform one or more actions.

According to certain aspects, applying blockchain technology to sensitive data, including healthcare, insurance, mutual funds, banking, and other types of personal data involves several privacy and security challenges. In one aspect, each node of the blockchain maintains its own copy of the distributed ledger. Private personal data associated with one node may be stored at many other nodes of the blockchain. Accordingly, the systems and methods disclosed herein relate to using encryption techniques to control access to the personal data. To this end, although each node may store an encrypted version of the personal data, only those nodes with sufficient permissions are provided a key to decrypt and comprehend the encrypted personal data. Said another way, the disclosed systems and methods enable the application of blockchain technology to particular types of data that would otherwise run afoul of privacy concerns and/or regulations in a traditional, open blockchain environment.

In one aspect, a smart contract may be created to control access to a grouping of personal data, such as documents to be filed with a regulator, identification information, documents associated with an insurance claim, and so on. When the smart contract is created, a management node may assign the smart contract both a private key and a public key using known asymmetric public key cryptography techniques (e.g., factorization, logarithmic, elliptic curve, etc.). The personal data associated with the smart contract may only be stored in the distributed ledger after first being encrypted using the public key for the smart contract. Thus, only a party that has the private key for the smart contract is capable of decrypting the personal data. The management node may ensure that only authorized nodes receive the private key for the smart contract.

In view of the aforementioned modifications to blockchain technology to enable the inclusion of personal information, there are increased concerns that nodes may attempt to spoof and/or otherwise imitate authorized nodes to attain access to the sensitive personal information. To this end, a first node may send a modified message to the management node of the blockchain to make it appear as though the message has been transmitted from a second node that is authorized to view the personal data. In some traditional environments, the management node may be fooled by the modified message and transmit a key to the first node to inappropriately grant access to the personal information. Accordingly, the systems and methods disclosed herein may relate to the use of digital signatures to verify the originator of messages sent by each node of the blockchain.

To this end, when a node joins the blockchain, the management node may generate a public key and a private key for the node. In one aspect, the public key for the node is stored in a database of public keys accessible by all nodes of the blockchain. When the node sends a message to another node of the blockchain, the node may include a digital signature that is encrypted using the private key for the node. The digital signature may be an identity of the node, a common phrase that all digital signatures use, and/or other known digital signature techniques. Thus, when a second node receives the message from the node, the second node may retrieve the public key corresponding to the node the message indicates that originated the message. Using the public key, the second node may decrypt the digital signature to verify that the message was sent by the indicated sender. To this end, because a spoofing node does not have access to the private key for the node, the second node will be unable to decrypt the digital signature applied by the spoofing node using the public key for the node. Thus, the second node can readily detect the spoofing attempt and discard the message. Again, in some traditional applications of blockchain technology, such personal information maintained in the distributed ledger may be exposed through such spoofing attacks. Said another way, the disclosed systems and methods herein do not merely relate to applying blockchain technology to new types of personal data, but to improving the data security for the personal data now that blockchain technology has been applied.

Exemplary Blockchains & Distributed Ledgers

FIG. 1A depicts an exemplary database system 100 in accordance with one aspect of the present disclosure. FIG. 1A includes a central authority 102, a plurality of nodes 104A, 104B, and 106, a central ledger 108, and a plurality of network connections 110. In one example operation of the database system 100, one of the nodes, for example Node A 104A, issues a request to the central authority 102 to perform an action on data stored in the central ledger 108. This request may be a request to create, read, update, or delete data that is stored in the central ledger 108.

The central authority 102 may receive the request, processes the request, make any necessary changes to the data stored in the central ledger 108, and/or inform the requesting node, Node A 104A, of the status of the request. The central authority 102 may also send out status updates to the other nodes on the network about the change made, if any, to the data as requested by Node A 104A. In the database system 100, all interaction with the data stored in the central ledger 108 occurs through the central authority 102. In this way, the central authority functions as a gatekeeper of the data.

Accordingly, the central authority 102 operates a single point of entry for interacting with the data, and consequently the central authority 102 is a single point of failure for the entire database system 100. As such, if the central authority 102 is not accessible to the nodes in the database system 100, then the data stored in the central ledger 108 is not accessible. In another example, each individual node may keep their own databases and then at the end of the day each node sends a copy of their database to the central authority 102 where the databases received are reconciled to form a single cohesive record of the data stored in the central ledger 108.

Figure 1B:
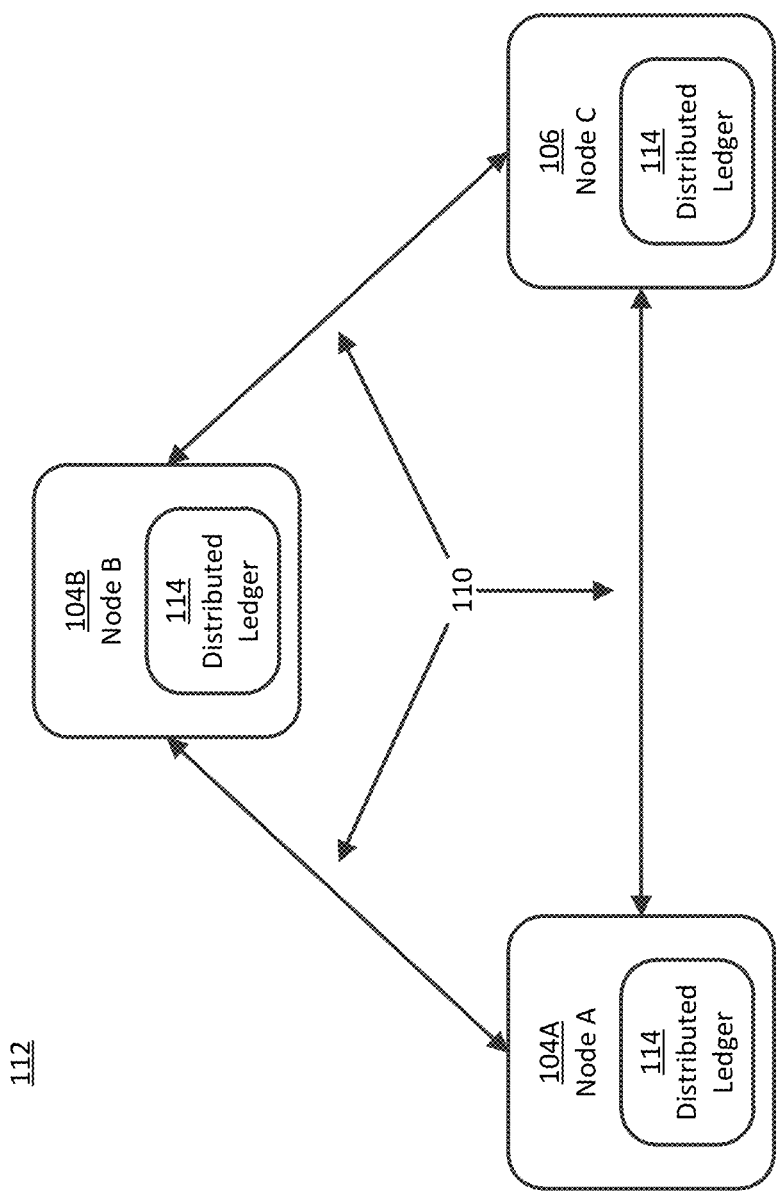
FIG. 1B depicts an exemplary distributed ledger system 112 in accordance with one aspect of the present disclosure.

Conversely, FIG. 1B depicts an exemplary distributed ledger system 112 in accordance with one aspect of the present disclosure. An example of a distributed ledger system 112 is the blockchain system described above. FIG. 1B includes a plurality of nodes 104A, 104B, and 106, a distributed ledger 114, and network connections 110. In a distributed ledger system 112, each node keeps a copy of the distributed ledger 114. As changes are made to the distributed ledger 114 each node updates their copy of the distributed ledger 114. A consensus mechanism may be used by the nodes in the distributed ledger system 112 to decide when it is appropriate to make changes to the distributed ledger 114. Therefore, each node has their own copy of the distributed ledger 114, which is identical to every other copy of the distributed ledger 114 stored by each other node. The distributed ledger system 112 is more robust than a central authority database system, which is depicted in FIG. 1A, because the distributed ledger system 112 is decentralized and there is no single point of failure.

Figure 2A:
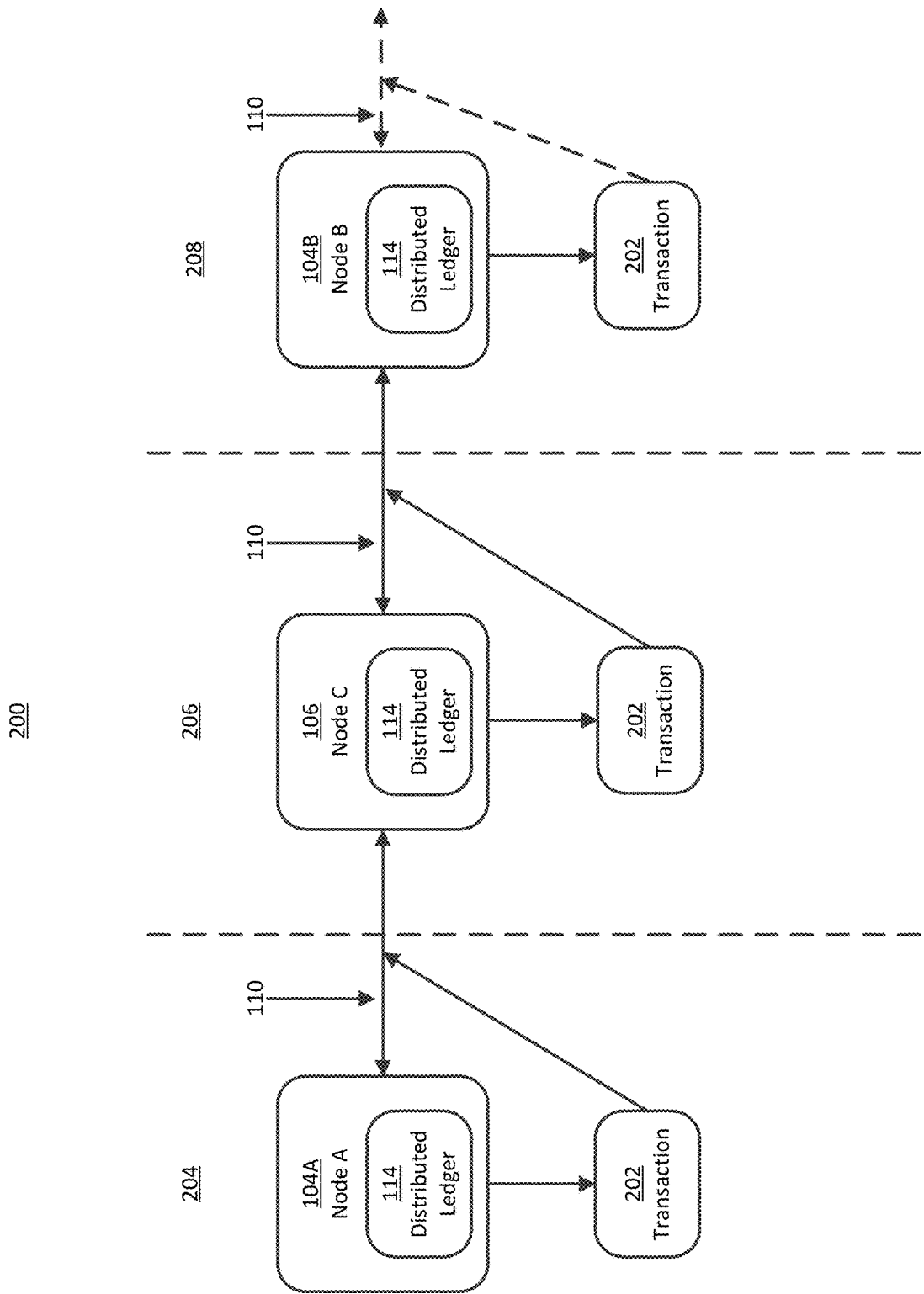
FIG. 2A depicts an exemplary transaction flow 200 in accordance with one aspect of the present disclosure.

FIG. 2A depicts an exemplary transaction flow 200 in accordance with one aspect of the present disclosure. FIG. 2A includes a transaction 202, three different time frames 204, 206, and 208, a set of nodes, network connections 110, and a distributed ledger 114. The transaction flow 200 may represent a sequential flow of a transaction through a network, such as the network depicted in FIG. 1B. For example, at time 204 Node A 104A generates a transaction 202. The transaction 202 may use data that is stored in the distributed ledger 114, or the transaction 202 may use data received by the node from outside the distributed ledger 114. Node A 104A may transmit the newly generated transaction to Node C 106 via the network connection 110.

At time 206, Node C 106 receives the transaction 202 and confirms that the information contained therein is correct. If the information contained in the transaction 202 is not correct Node C 106 may reject the transaction and not propagate the transaction 202 through the system. If the information contained in the transaction 202 is correct Node C 106 may transmit the transaction 202 to its neighbor Node B 104B. Similarly, at time 208 Node B 104B may receive the transaction 202 and either confirm or reject the transaction 202. In some embodiments, the Node B 104B may not transmit the confirmed transaction 202, because there are no further nodes to transmit to, or all the nodes in the network have already received transaction 202.

In some embodiments, at any of time frames 204, 206, or 208, any of the nodes may add the confirmed transaction 202 to their copy of the distributed ledger 114, or to a block of transactions stored in the distributed ledger. In some embodiments, confirming the transaction 202 includes checking a cryptographic key-pair for participants involved in the transaction 202. Checking the cryptographic key-pair may follow a set method laid out by a consensus protocol, such as the consensus protocol discussed in FIG. 1B.

Figure 2B:
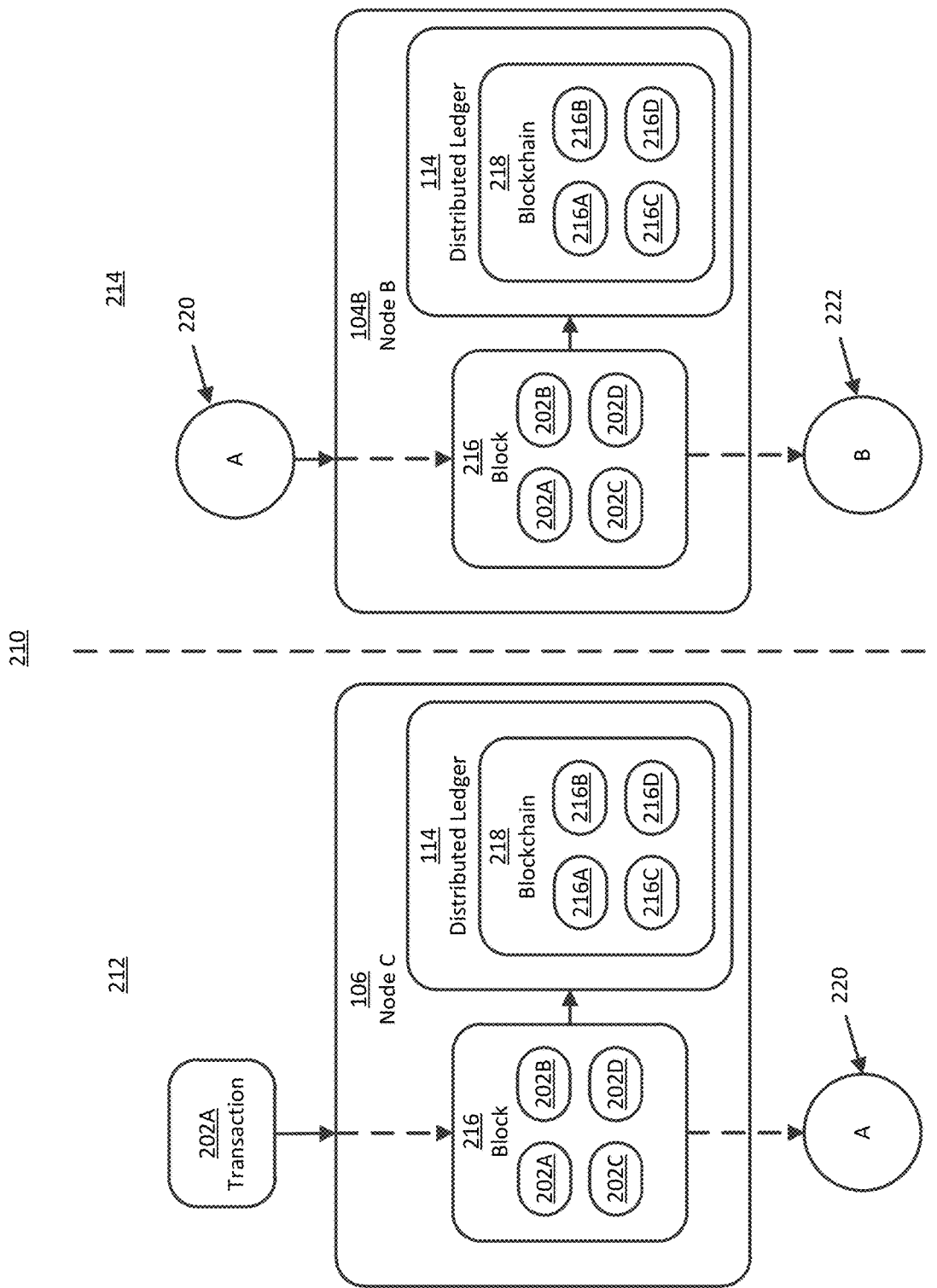
FIG. 2B depicts an exemplary block propagation 210 in accordance with one aspect of the present disclosure.

FIG. 2B depicts an exemplary block propagation 210 in accordance with one aspect of the present disclosure. FIG. 2B includes two time frames 212 and 214, Node C 106 and Node B 104B, a set of transactions 202A-202D, a set of blocks of transactions 216A-216D, a distributed ledger 114, and a blockchain 218. The block propagation 210 may follow the blockchain system described above, or may follow another blockchain propagation algorithm.

The block propagation 210 may begin with Node C 106 receiving transaction 202A at time 212. When Node C 106C confirms that transaction 202A is valid, the node may add the transaction to a newly generated block 216. As part of adding the transaction 202A to block 216, Node C 106 may solve a cryptographic puzzle and include the solution in the newly generated block 216 as proof of the work done to generate the block 216. This proof of work may be similar to the proof of work described above which utilizes guessing a nonce value. In other embodiments, the transaction 202A may be added to a pool of transactions until enough transactions exist to add together to create a block. Node C 106 may transmit the newly created block 216 to the network at 220. Before or after propagating the block 216, Node C 106 may add the block 216 to its copy of the blockchain 218.

At time 214 Node B 104B may receive the newly created block 216. Node B 104B may verify that the block of transactions 216 is valid by checking the solution to the cryptographic puzzle provided in the block 216. If the solution is accurate then Node B 104B may add the block 216 to its blockchain 218 and transmit the block 216 to the rest of the network at 222.

Figure 3:
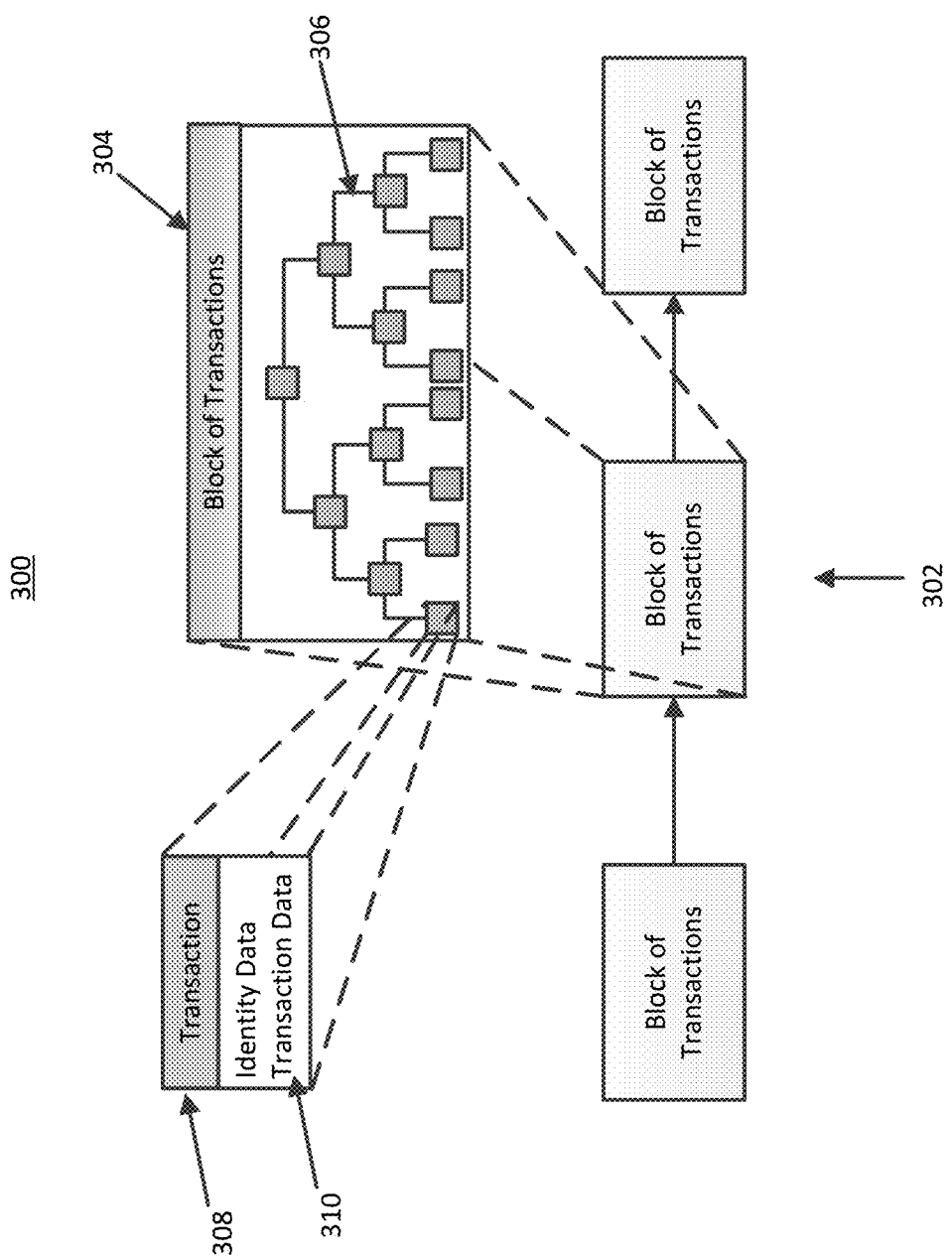
FIG. 3 depicts an exemplary blockchain 300 in accordance with one aspect of the present disclosure.

FIG. 3 depicts an exemplary blockchain system 300 in accordance with one aspect of the present disclosure. FIG. 3 includes a blockchain 302, a block of transactions 304, a Merkle Tree 306, and a transaction 308. The Merkle Tree 306 may be the same Merkle Tree described above that cryptographically links transactions together. In other embodiments, the blockchain system 300 may utilize a different method of organizing transactions in a block. In some embodiments, the blockchain system 300 includes a plurality of blocks connected together to form a chain of blocks of transactions 302. Each block of transactions 304 may include at least one transaction 308. In other embodiments, each block of transactions 304 has a size limit that necessarily limits the number of transactions that the block may store. Each block of transactions 304 includes a reference to a previous block of transactions that was added to the blockchain 302 prior to the block of transactions 304 being added to the blockchain 302. As such, and as described above, each block of transactions 304 is linked to every other block in the blockchain 302.

In some embodiments, the block of transactions 304 may organize the transactions it has received into a Merkle Tree 306 to facilitate access to the stored transactions. The transactions may be hashed using a cryptographic hash algorithm, such as the algorithms discussed above, and the hash of each transaction is stored in the tree. As the tree is constructed the hash of each adjacent node is hashed together to create a new node that exists at a higher level in the tree. Therefore, the root of the tree, or the node at the top of the tree, is dependent upon the hash of each transaction stored in the tree. Each transaction 308 may include a set of data 310. The set of data 310 may include identifying data for the transaction, and transaction data identifying the nature of the transaction and what the transactions entails.

Exemplary Blockchain Management Techniques

Figure 4A:
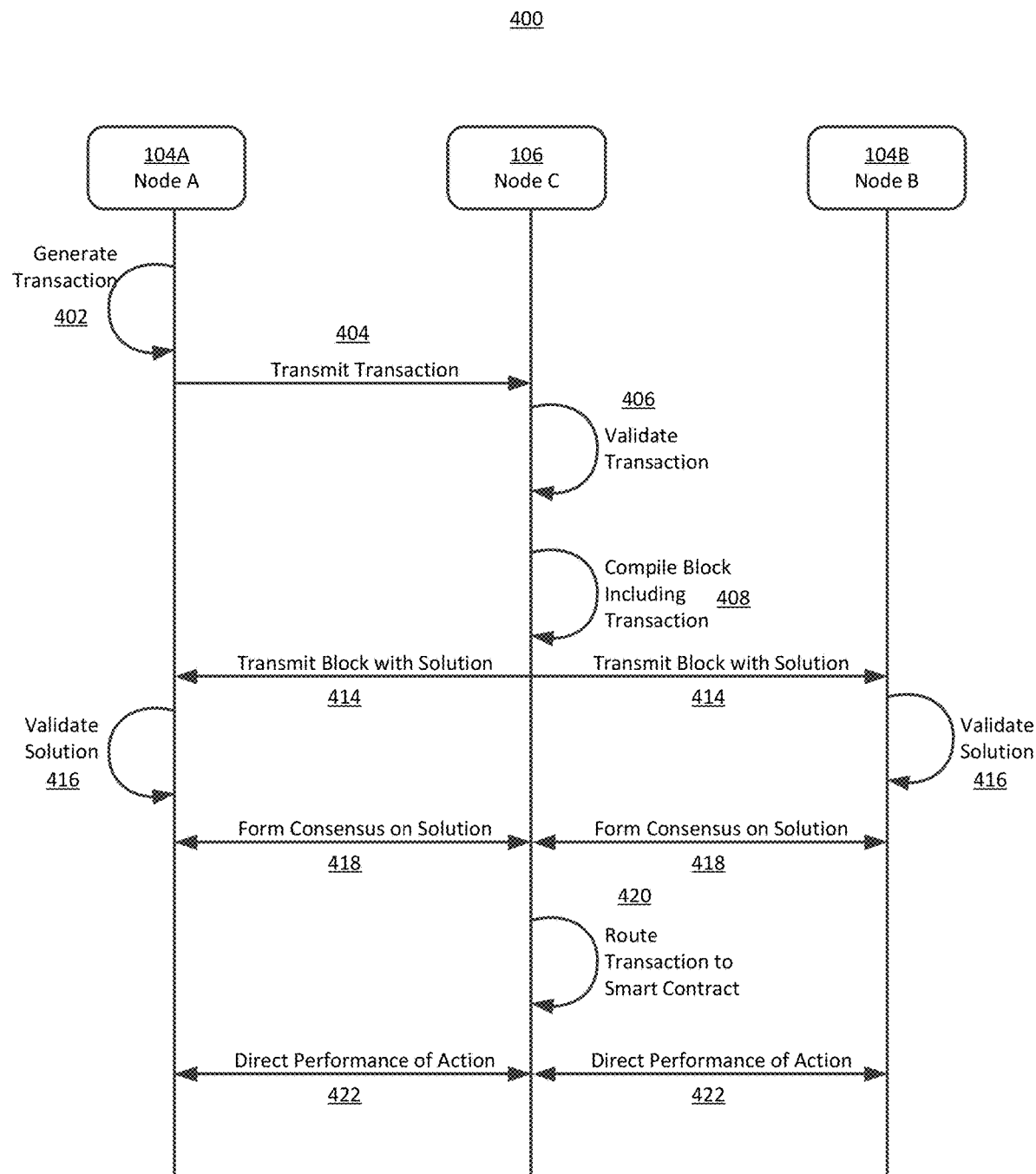
FIG. 4A depicts an exemplary signal diagram 400 for transferring funds via a blockchain, in accordance with one aspect of the present disclosure.

Referring now to FIG. 4A, depicted is an exemplary signal diagram 400 for transferring funds via a blockchain. In one example, the funds are transferred as part of a payment obligation, such as the termination of an insurance claim. The signal diagram 400 may be facilitated in part by at least three nodes of the blockchain, a processing node 104A (Node A), a validation node 104B (Node B), and a blockchain management node 106 (Node C). Although the signal diagram 400 depicts three nodes acting in conjunction, it should be appreciated that the signal diagram 400 may be implemented across any number of nodes of the blockchain.

The signal diagram 400 may begin when the processing node 104 generates (402) a transaction indicating a payment obligation, such as a payout of an insurance claim. In one scenario, the processing node 104A is associated with a plurality of pending payment obligations. In one aspect, one or more of the pending payment obligations may correspond to a smart contract. The processing node 104A may receive data relating to the plurality of pending payment obligations and/or actively monitor a claims processing environment to detect data relating to the plurality of pending payment obligations.

In another aspect, when new data relating to a particular payment obligation of the plurality of payment obligations is received and/or detected by the processing node 104A, the processing node 104A may generate a transaction to include the new data in the blockchain. The data associated with the particular payment obligation may indicate a status of the payment obligation, any documents generated in support of the payment obligation, an identity of a payment processor, subrogation data, a payor party, a payee party, and so on.

According to certain aspects, after the processing node 104A generates the transaction, the processing node 104A may transmit (404) the transaction to the blockchain management node 106. In one embodiment, the processing node 104A transmits transactions individually as they are generated. In other embodiments, the processing node 104A may periodically (e.g., every 5 minutes, every 10 minutes, every hour, etc.) or aperiodically (e.g., upon generating a threshold number of transactions) transmit a plurality of transactions relating to a plurality of smart contracts.

The blockchain management node 106 may then validate (406) the transaction(s) received from the processing node 104A. In one aspect, validation may involve ensuring the data in the transaction matches and/or is consistent with data stored within the blockchain. For example, validation may include ensuring that documents associated with a particular payment obligation all utilize the same reference number, policy number, policy holder, etc. In another aspect, validation may involve the blockchain management node 106 verifying that the transaction was transmitted by an authorized node.

In some embodiments, only a subset of all nodes within the blockchain may be permitted to transmit transactions pertaining to payment obligations. To this end, each node may each be associated with a set of permissions stored at a database accessible to the blockchain management node 106. Accordingly, the blockchain management node 106 may cross-reference the sender of the transaction (e.g., the processing node 104A) against the permissions database to ensure that the sender had the authority to send the transaction.

In some embodiments, to prevent spoofing the identity of authorized nodes, the processing node 104A may include a digital signature when sending the transaction. The digital signature may include an identifier of the processing node 104A as encrypted by a private key for the processing node 104A. In these embodiments, the blockchain management node 106 may decrypt the digital signature using a public key for the processing node 104A to retrieve the unencrypted identity of the processing node 104A. Accordingly, validation may involve comparing the unencrypted identity included in a digital signature of the transaction to a known identity of the sending node.

If the transaction is not validated, such as when the data included in the transaction is inconsistent with data stored in the blockchain and/or when the unencrypted digital signature does not match the identity of the sending node, the blockchain management node 106 may discard the transaction. As a result, the invalid transaction is never included within the blockchain. On the other hand, if the transaction is validated, such as when the data included in the transaction is consistent with data stored in the blockchain and/or the digital signature included in the transaction is verified, the blockchain management node 106 may compile (408) the transaction, as well as any number of other transactions, into a block of transaction to be included in the blockchain.

As part of compiling the block, the blockchain management node 106 may generate a hash value for each transaction included in the block. The blockchain management block 106 may then cryptographically combine these hash values, such as through the use of a Merkle Tree, to generate a hash value of the block as a whole. This hash value may then be combined with the hash value of the previous block of the blockchain to produce the final hash value for the block. This final hash value for the block may be included in a header of the block.

In one embodiment, the blockchain management node 106 may compile the block periodically (e.g., every five minutes, every ten minutes, etc.). In other embodiments, the blockchain management node 106 may compile the block aperiodically (e.g., in response to receiving a threshold number of validated transactions).

The blockchain management node 106 may transmit (414) the compiled block to one or more nodes of the blockchain, including the processing node 104A and the validation node 104B. In order to link the compiled block to the blockchain, a solution to a cryptographic puzzle involving the header of the proposed block and a nonce must be found (this is sometimes referred to as "mining"). In the depicted scenario, the blockchain management node 106 is the sole miner for the blockchain and includes the determined solution when transmitting the proposed block. However, in alternate embodiments, one or more nodes may additionally or alternatively attempt to solve the cryptographic puzzle. In these embodiments, the blockchain management node 106 may transmit the proposed block and another node may transmit the solution to the cryptographic puzzle.

As described elsewhere herein, solving the cryptographic puzzle is a processor intensive task that may be sped up by enlisting the processing power of multiple nodes. That said, without adequate rewards, nodes may be reluctant to assume the power costs associated with being a mining node.

In any event, the nodes that receive the block and the solution to the cryptographic puzzle may attempt to validate (416) the solution. As described elsewhere herein, unlike determining the solution, validating the solution involves relatively little processing power. Accordingly, in some embodiments, a majority, if not all, nodes of the blockchain may be validation nodes. Each of the validation nodes may form (418) a consensus on the solution to the proposed block. More particularly, the validation nodes may vote to approve the proposed block's inclusion into the blockchain upon successfully verifying the solution. On the other hand, the validation nodes may vote to disapprove and/or abstain from voting if the validation nodes determine that the solution does not solve the cryptographic puzzle.

Consensus may be formed when over half of the nodes have voted for the inclusion of the proposed block. Upon consensus, the proposed block is considered to be included in the blockchain.

The signal diagram 400 continues when the blockchain management node 106 routes (420) the transaction and/or the data included therein to a particular smart contract. In one embodiment, routing a transaction may include extracting identity data (e.g., reference number, policyholder, account number) and utilizing the identity data to query a plurality of smart contracts. The smart contract that matches the identity information may be considered "the particular smart contract." Accordingly, routing may further include the block management node 106 inputting the transaction information (e.g., documents, status information, etc.) into the particular smart contract. To this end, based upon the transaction information, the particular smart contract may determine that a payment obligation should be paid out to an indicated party.

The blockchain management node 106 may then direct (422) the performance of an action to enforce the particular smart contract. For example, in response to the status of a payment obligation changing to a status indicating that a transfer of funds should occur, the particular smart contract may dictate that the funds should be transferred.

More particularly, based upon the transaction information, the particular smart contract direct that a particular amount of funds should be transferred from a payor account to a payee account. Accordingly, the blockchain management node 106 may interact with one or more nodes, including the processing node 104A and/or the validation node 104B, to ensure the directed transfer of money occurs.

In one embodiment, directing the transfer of money may include the blockchain management node 106 generating a fund transfer transaction. The fund transfer transaction may indicate the amount of funds to transfer, a payor account, a payee account, a time of transfer and/or other fund transfer information. In one aspect, the blockchain management node 106 may also include a digital signature based in the fund transfer transaction to ensure the authenticity of the fund transfer transaction. The digital signature may be an identity of the blockchain management node 106 that has been encrypted using a private key for the blockchain management node 106. The blockchain management node 106 may compile the fund transfer transaction into another block of the blockchain. This block may be distributed to one or more nodes to form a consensus to include the block in the blockchain. According to some aspects, the process of including the block to the blockchain may involve substantially similar steps as those described with respect to the proposed block at steps 408-418.

In one embodiment, the blockchain may include a fund transfer node (although not expressly depicted, the fund transfer node may be any of the processing node 104A, the validation node 104B, the blockchain management node 106, and/or any other node of the blockchain). The fund transfer node may monitor the transactions included in newly added blocks of the block chain to detect a fund transfer transaction. The fund transfer node may then interact with the computing systems associated with the payor account and the payee account to ensure that the fund transfer occurs as directed by the particular smart contract.

In one aspect, the fund transfer node may generate a transaction to indicate that the fund transfer occurred successfully and the payment obligation is satisfied. This transaction may by compiled into yet another block of the blockchain. It should be appreciated that signal diagram 400 may include additional, less, and/or alternative actions, including those discussed elsewhere herein. For example, in some embodiments, the actions associated with multiple nodes may be performed by a single node and/or the actions associated with a single node may be divided across one or more nodes.

Figure 4B:
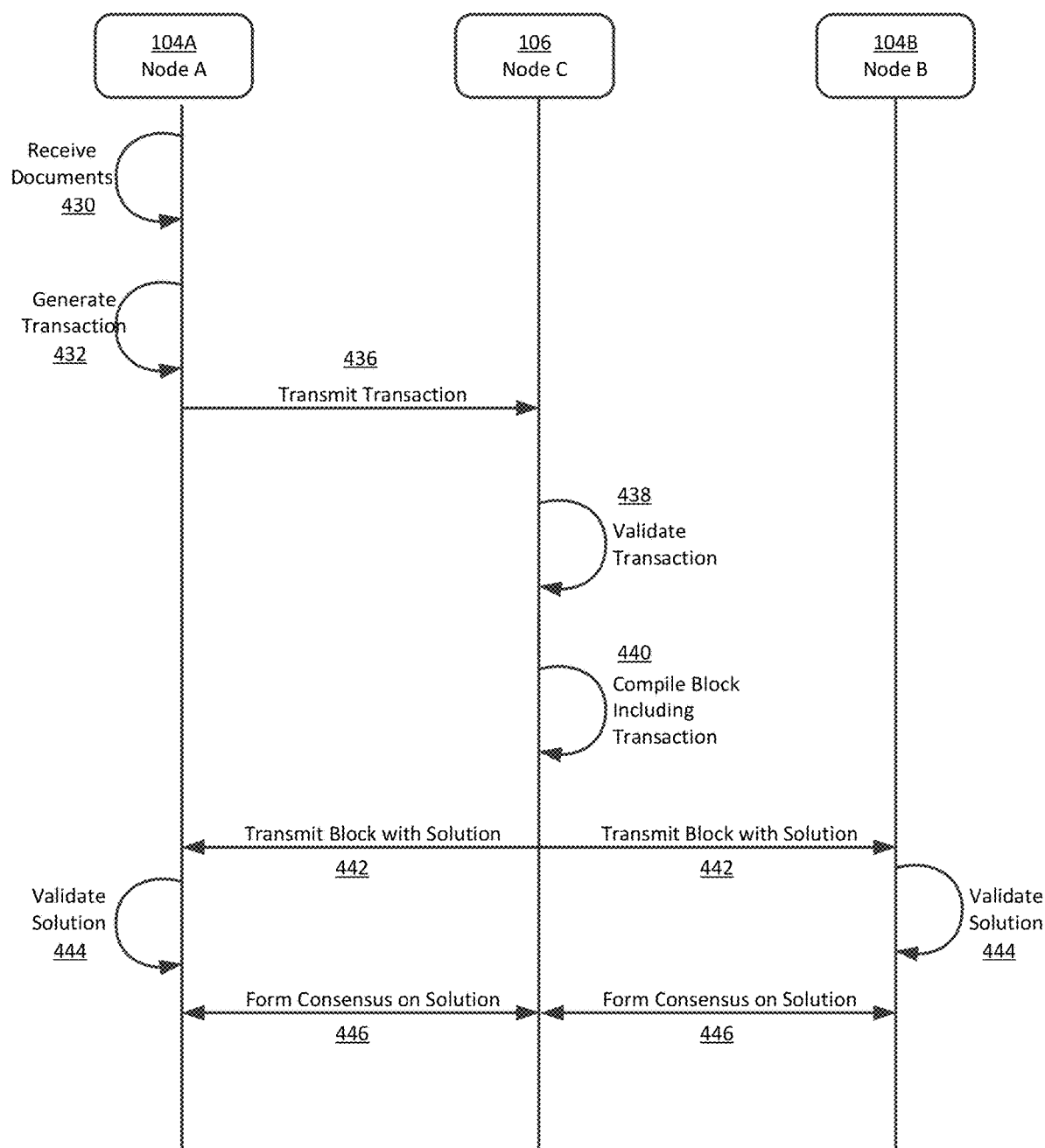
FIG. 4B depicts an exemplary signal diagram 425 associated with complying with customer identification requirements associated with anti-money laundering regulations, in accordance with one aspect of the present disclosure.

Turning now to FIG. 4B, depicted is an exemplary signal diagram 425 associated with complying with customer identification requirements associated with anti-money laundering regulations. The signal diagram 425 may be facilitated in part by at least three nodes of the blockchain, a processing node 104A (Node A), a validation node 104B (Node B), and a blockchain management node 106 (Node C). Although the signal diagram 425 depicts three nodes acting in conjunction, it should be appreciated that the signal diagram 425 may be implemented across any number of nodes of the blockchain.

The signal diagram 425 may begin when the processing node 104A receives (430) one or more documents used to validate the identity of an account holder. The documents may include a driver's license, a passport, an articles of incorporation, a partnership agreement, a state-issued business license, and/or any other document utilized to validate the identity of the account holder. One or more of the documents may include be associated with multiple files, such as a scan or other form of digital copy of the document (with or without the application of optical character recognition techniques) and/or a text document including the text of the documents. In one embodiment, the documents are uploaded to an anti-money laundering compliance system as part of an account creation process. According to some aspects, the account creation process may automatically send the documents to the processing node 104A and/or the processing node 104A may actively monitor account creation systems to detect that the documents have been uploaded.

According to certain aspects, the processing node 104A may compare the one or more documents to each other to detect a discrepancy between one or more of the documents. For example, the passport and the driver's license may indicate a different home address. As another example, the business license may indicate the name of the account holder is Acme Corp., but the articles of incorporation may indicate the name of the account holder is Acme, Inc. If the processing node 104A detects a discrepancy between the one or more documents, the processing node 104A may include an indication of the discrepancy in the transaction.

After the processing node 104A receives the documents, the processing node 104A may generate (432) a new account transaction that includes the one or more documents. According to certain aspects, the processing node 104A may apply a digital signature to the new account transaction. The digital signature may be an identity of the processing node 104A that is encrypted using a private key of the processing node 104A. The processing node 104A may then transmit (436) the new account transaction to the blockchain management node 106.

The blockchain management node 106 may then validate (438) the new account transaction. In one aspect, validation of the new account transaction may involve the blockchain management node 106 verifying that the transaction was transmitted by an authorized node. As described elsewhere herein, only a subset of all nodes within the blockchain may be permitted to transmit new account transactions. To this end, each node may each be associated with a set of permissions stored at a database accessible to the blockchain management node 106.

Accordingly, the blockchain management node 106 may cross-reference the sender of the transaction (e.g., the processing node 104A) against the permissions database to ensure that the sender had the authority to send the new account transaction. If the processing node 104A included a digital signature in the new account transaction, the blockchain management node 106 may decrypt the digital signature using a public key for the processing node 104A to retrieve the unencrypted identity of the processing node 104A.

Accordingly, validation may additionally or alternatively involve comparing the unencrypted identity included in a digital signature of the transaction to a known identity of the sending node. If the blockchain management node 106 fails to validate the permissions and/or digital signature associated with the sending node, the blockchain management node 106 may discard the new account transaction.

In another aspect, validating the new account transaction may additionally or alternatively include validating that the account holder is an entity legally permitted to be an account holder. To this end, one or more governments and/or (inter-)governmental agencies may publish lists of sanctioned entities, including those with suspected links to terrorism.

Accordingly, validating that the account holder is an entity legally permitted to be an account holder may include extracting an identity of the account holder from the one or more documents and comparing the identity to the one or more lists. If the identity of the account holder is included in one or more lists, then the blockchain management node 106 may prevent the account holder from opening the new account. On the other hand, if the identity of the account holder is absent from the one or more lists, then the blockchain management node 106 may permit the account holder to open the new account.

The blockchain management node 106 may permit or prevent the account holder from opening the new account by modifying the new account transaction to include an indication as to whether the account holder is legally permitted to open the new account (i.e., whether an identity of the account holder included in one or more of the lists). In one embodiment, this indication may be a Boolean flag.

After including the indication as to whether the new account holder is legally permitted to open the new account in the new account transaction, the blockchain management node 106 may compile (440) the transaction into a new block of the blockchain. The blockchain management node 106 may then transmit (442) the block (and a solution to the corresponding cryptographic puzzle) to one or more nodes of the blockchain, including the processing node 104A and the validation node 104B. The one or more nodes may then verify (444) the solution to the cryptographic puzzle and form (446) a consensus to add the new block to the blockchain. The actions associated with steps 440-446 may involve substantially similar actions as those described with respect to steps 408-418 of the signal diagram 400.

According to some aspects, after the block including the new account transaction has been added to the blockchain, the processing node 104A may analyze the new account transaction to detect the indication of whether or not the account holder is legally permitted to open the new account. If the account holder is permitted to open the new account, the processing node 104A may interact with the new account processing systems to indicate compliance with customer identification requirements. In some embodiments, additional processing may be required before the new account processing systems actually opens the new account. If the account holder is not permitted to open the new account, the processing node 104A may interact with the new account processing systems to indicate that the new account cannot be opened.

It should be appreciated that signal diagram 425 may include additional, less, and/or alternative actions, including those discussed elsewhere herein. For example, in some embodiments, the actions associated with multiple nodes may be performed by a single node and/or the actions associated with a single node may be divided across one or more nodes.

Figure 4C:
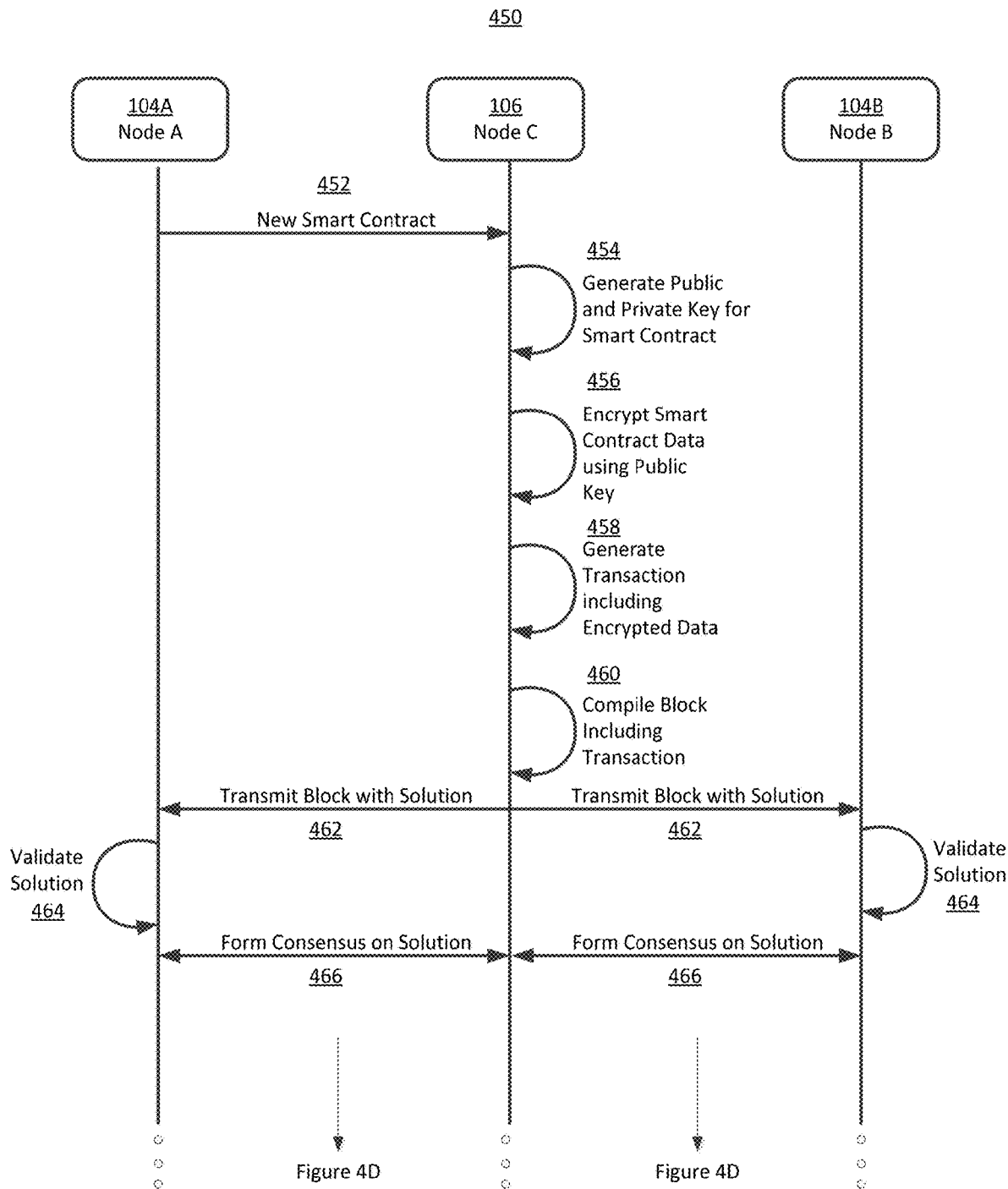
FIGS. 4C-D depict an exemplary signal diagram 450 associated with enforcing access rights to data associated with a smart contract, in accordance with one aspect of the present disclosure.
Figure 4D:
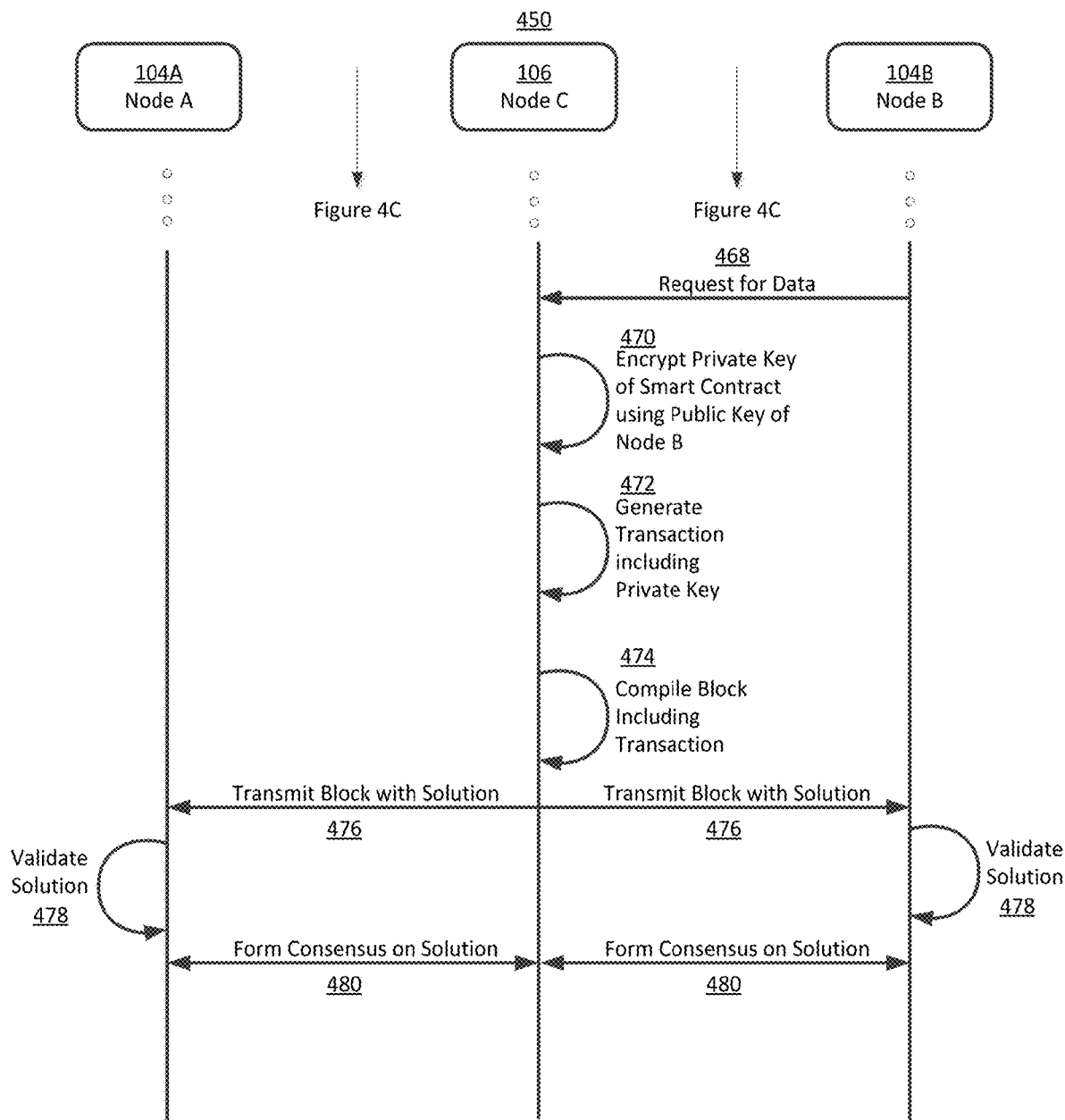

Turning now to FIGS. 4C and 4D, depicted is an exemplary signal diagram 450 associated with enforcing access rights to data associated with a smart contract. The signal diagram 425 may be facilitated in part by at least three nodes of the blockchain, a contracting node 104A (Node A), an accessing node 104B (Node B), and a blockchain management node 106 (Node C). Although the signal diagram 450 depicts three nodes acting in conjunction, it should be appreciated that the signal diagram 450 may be implemented across any number of nodes of the blockchain.

The signal diagram 450 may begin when the contracting node 104A transmits (452) a new smart contract to the blockchain management node 106. For example, the new smart contract may govern access to information associated with an insurance policy, ensure compliance with an auditing program, file documents in accordance with regulatory requirements, transfer funds as part of a payment obligation, and/or other functionality associated with smart contracts disclosed elsewhere herein. Accordingly, the new smart contract may have been generated in response the any number of events, such as opening a new policy, filing a claim, assuming compliance responsibilities for a client, offering a new insurance product, and so on.

In some embodiments, the contracting node 104A may instead transmit a request to create a new smart contract. In these embodiments, the blockchain management node 106 may generate the new smart contract. Accordingly, transmitting the new smart contract may involve, in some embodiments, transmitting a request to create the new smart contract.

After receiving the new smart contract, the blockchain management node 106 may generate (454) both a public key and a private key for the new smart contract in accordance with generally known cryptography techniques. In some embodiments, the blockchain management node 106 may be interconnected with public key database (not depicted) that stores a plurality of public keys for a plurality of smart contracts and/or nodes.

In these embodiments, the blockchain management node 106 may store the newly generated public key for the new smart contract in the public key database. Additionally or alternatively, the blockchain management node 106 may publish the public key for the new smart contract to the blockchain by generating a new transaction associating the new smart contract to the public key for the new smart contract. Consequently, every node may access the public key for the new smart contract.

According to certain aspects, the blockchain management node 106 may use the public key for the smart contract to encrypt (456) data associated with the smart contract. By encrypting the data using the public key for the smart contract, only a node that has the private key for the smart contract can decrypt the data. Thus, the blockchain management node 106 may only transmit the private key to nodes that are authorized to view the data. In one scenario, the data is included with the initial transmission of the new smart contract. In another scenario, the blockchain management node 106 receives the data subsequent to receiving the new smart contract.

The blockchain management node 106 may then generate (458) a transaction that includes the encrypted data. More particularly, the blockchain management node 106 may include the encrypted data in the transaction information component of the transaction. It should be appreciated that the identity information may remain unencrypted to provide an indication of which encryption key should be applied to decrypt the transaction information. In some embodiments, the blockchain management node 106 may include a digital signature in the transaction. The digital signature may be based upon the private key of the blockchain management node 106.

According to certain aspects, the blockchain management node 106 may then compile (460) the transaction into a new block of the blockchain. The blockchain management node 106 may then transmit (462) the block (and a solution to the corresponding cryptographic puzzle) to one or more nodes of the blockchain, including the contracting node 104A and the accessing node 104B. The one or more nodes may then verify (444) the solution to the cryptographic puzzle and form (466) a consensus to add the new block to the blockchain. The actions associated with steps 460-466 may involve substantially similar actions as those described with respect to steps 408-418 of the signal diagram 400.

The signal diagram 450 may proceed on FIG. 4D when the accessing node 104B transmits a request to the blockchain management node 106 to gain access the data associated with new smart contract. It should be appreciated that although FIG. 4D depicts the request originating from the accessing node 104B, the request may originate from any node of the blockchain. In some embodiments, the request may originate at the blockchain management node 106 itself. As an example, the new smart contract may be associated with filing a document.

Accordingly, the new smart contract may indicate a filing date for the document. When the new smart contract detects that the current date is the filing date, the new smart contract may request and/or direct that the blockchain management node 106 provides access to the document at a node associated with an appropriate filing entity.

According to some aspects, the blockchain management node 106 may verify the request is a valid request. In one aspect, the blockchain management node 106 may attempt to verify that the sender of the request (in the depicted scenario, the accessing node 104B) is an appropriate entity to send the request. To this end, the blockchain management node 106 may query a permissions database (not depicted) to determine one or more permissions associated with the requesting node. If the requesting node has insufficient permissions to grant access to the data associated with the new smart contract (or any smart contract), the blockchain management node 106 may discard the request.

Similarly, the blockchain management node 106 may also verify that the accessing node 104B has permissions to access the data associated with the new smart contract. Accordingly, the blockchain management node 106 may query the permissions database to determine an access level associated with the accessing node 104B. If the accessing node 104B has insufficient permissions to receive access to the data associated with the new smart contract, the blockchain management node 106 may discard the request.

In scenarios in which the requesting node included a digital signature in the request, the blockchain management node 106 may also verify the authenticity of the digital signature. Accordingly, the blockchain management node 106 may extract an identity of the requesting node from the request to retrieve the public key for the requesting node from the public key database. The blockchain management node 106 may utilize the public key for the requesting node to decrypt the digital signature. If the decrypted digital signature does not match an expected value, the blockchain management node 106 may discard the request.

After verifying the request, the blockchain management node 106 may transmit the private key for the new smart contract to the accessing node 104B. In one scenario, the blockchain management node 106 transmits the private key for the new smart contract outside of the blockchain (e.g., via a direct communication channel).

In another scenario, the blockchain management node 106 transmits the private key for the new smart contract within the blockchain. In this scenario, the blockchain management node 106 may encrypt (470) the private key for the new smart contract using the public key for the accessing node 104B.

The blockchain management node 106 may retrieve the public key for the accessing node 104B from the public key database and/or the requesting node may include an indication of the public key for the accessing node 104B in the request. By encrypting the private key for the new smart contract using the public key for the accessing node 104B, only the accessing node 104B is capable of decrypting the key to access to the data associated with the new smart contract.

The blockchain management node 106 may then generate (472) a transaction that includes the encrypted private key for the new smart contract. In some embodiments, the blockchain management node 106 may include a digital signature in the transaction. According to some aspects, the blockchain management node 106 may then compile (474) the transaction into a new block of the blockchain. The blockchain management node 106 may then transmit (476) the block (and a solution to the corresponding cryptographic puzzle) to one or more nodes of the blockchain, including the contracting node 104A and the accessing node 104B. The one or more nodes may then verify (478) the solution to the cryptographic puzzle and form (480) a consensus to add the new block to the blockchain.

The actions associated with steps 474-480 may involve substantially similar actions as those described with respect to steps 408-418 of the signal diagram 400. It should be appreciated that signal diagram 450 may include additional, less, and/or alternative actions, including those discussed elsewhere herein. For example, in some embodiments, the actions associated with multiple nodes may be performed by a single node and/or the actions associated with a single node may be divided across one or more nodes.

Exemplary Policy Information Sharing Via Blockchain Method

Figure 5:
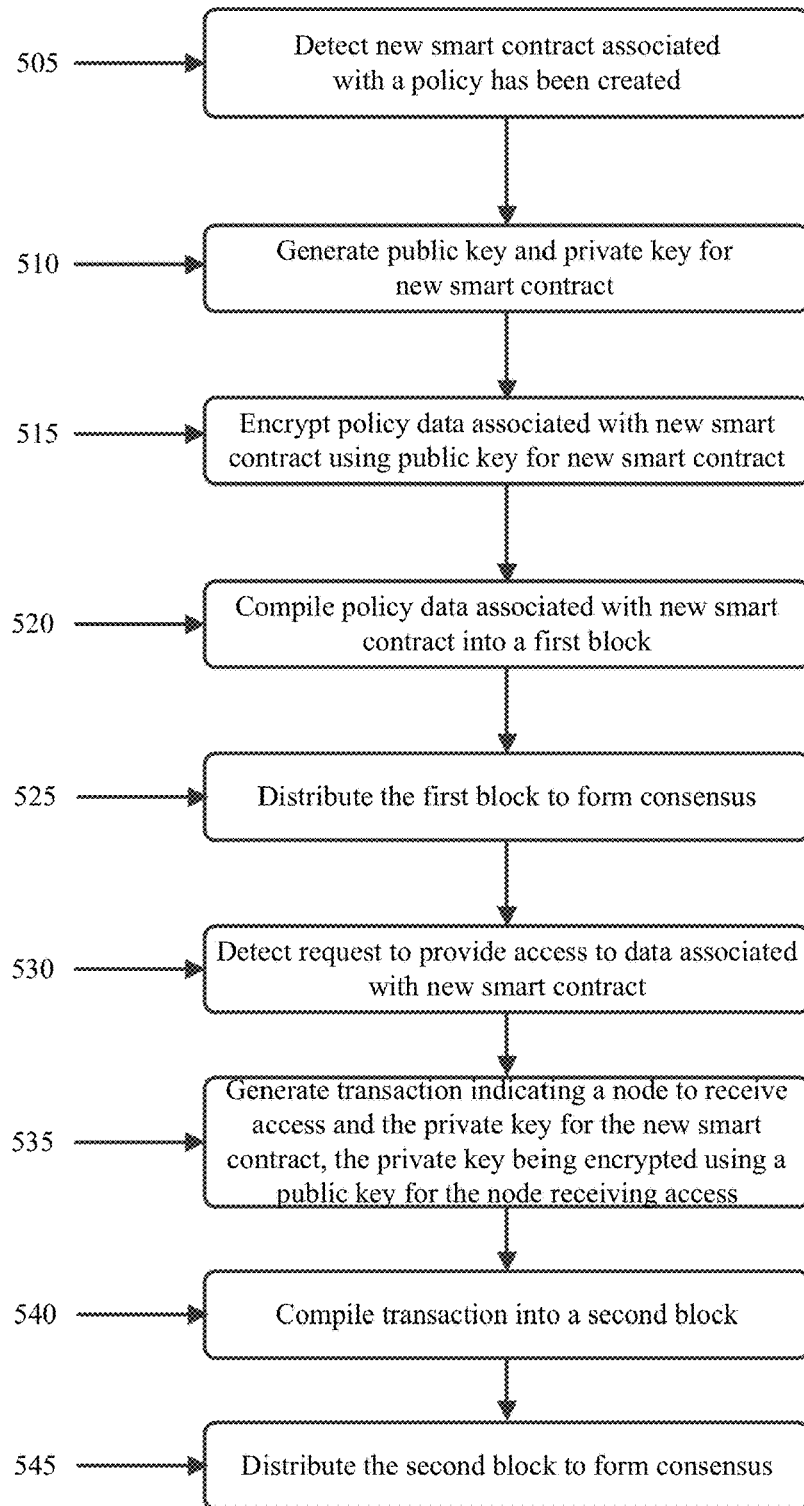
FIG. 5 depicts an exemplary computer-implemented method 500 of managing a blockchain to share information associated with a policy, in accordance with one aspect of the present disclosure.

FIG. 5 depicts a block diagram of an exemplary computer-implemented method 500 of managing a blockchain to share information associated with a policy. According to certain embodiments, the blockchain may be maintained by a plurality of nodes connected via a network, where each of the plurality of nodes may maintain a respective copy of the blockchain. The method 500 may be facilitated by a first node (such as the blockchain management node 106) of the plurality of nodes, where the first node may support execution of a dedicated application that may facilitate the functionalities of the method 500.

The method 500 may begin with the first node detecting (505) that a new smart contract associated with a policy has been created. The policy may be an insurance policy or any other type of policy that is associated with personal information of the policyholder. In one aspect, the new smart contract may be created when the policy is opened and/or when the policyholder applies for the policy. In some embodiments, detecting that the new smart contract has been created my include detecting a request to generate the new smart contract. In these embodiments, the first node may detect that the first node finished generating the new smart contract.

At block 510, the first node may generate a public key and a private key for the new smart contract. The public key and the private key may be generated using known asymmetric public key cryptography techniques (e.g., factorization, logarithmic, elliptic curve, etc.). In one embodiment, the first node may store the public key for the new smart contract in a public key database.

At block 515, the first node may encrypt policy data associated with the new smart contract using the public key for the new smart contract. For example, the policy data may include an electronic medical record. As another example, the policy data may include information describing the insurance policy, a lab result, a form or other document associated with the policy, or a confidential communication regarding the policy. In one aspect, as additional policy data is received by the first node over time, any additional policy data may also encrypted using the private key for the new smart contract.

At block 520, the first node may compile the policy data associated with the new smart contract into a first block of the blockchain. In one aspect, the encrypted policy data may be included in a transaction that includes the encrypted policy data in the transaction information component of the transaction. In one embodiment, the first node may associate the encrypted policy data with a digital signature that is encrypted utilizing a private key for the first node. When this transaction is included in the block, any number of other transactions may also be compiled into the block as well.

At block 525, the first node may distribute the first block to one or more nodes of the blockchain. The nodes may each attempt to solve a cryptographic puzzle based upon the header for the first block and a nonce. When a node solves the cryptographic puzzle, that node may transmit the solution to the other nodes to verify the solution. In one aspect, if a majority of the nodes verify the solution, then a consensus is formed that the first block should be added to blockchain.

At block 530, the first node may detect a request to provide a particular node of the blockchain access to the policy data associated with the new smart contract. The particular node may be associated with an attorney and/or estate planner associated with handling funds, liabilities, claims, payouts, or other features associated with the policy. In one embodiment, the first node may generate the request in response to a direction by the new smart contract itself. Additionally or alternatively, another node of the block chain may transmit, to the first node, the request to provide access to the policy data.

According to some aspects, the first node may validate the request to provide access to the policy data. In one aspect, validation may involve determining a permission level associated with the node that transmitted the request (the "requesting node) and/or the particular node that is to receive access. If either the node that transmitted the request or the particular node is not associated with an appropriate permission level, the first node may discard the request. In some embodiments, the request may also include a digital signature associated with the node that transmitted the request. In these embodiments, the first node may attempt to decrypt the digital signature using a public key for the node the transmitted the request. If the first node is unable to decrypt the digital signature, the first node may discard the request.

At block 535, the first node may generate a transaction indicating both the particular node that is to receive access to the policy data and the private key for the new smart contract. The first node may encrypt the private key for the new smart contract using the public key for the particular node before including the private key for the new smart contract in the transaction. In one embodiment, the first node may also include, in the transaction, a digital signature based upon the private key for the first node.

At block 540, the first node may compile the transaction including the private key for the new smart contract into a second block of the blockchain. When this transaction is included in the block, any number of other transactions may also be compiled into the block as well. It should be appreciated that although this block is referred to as a "second block," in some embodiments, the second block may be the same block as the first block.

At block 545, the first node may distribute the second block to one or more nodes of the blockchain. The nodes may each attempt to solve a cryptographic puzzle based upon the header for the second block and a nonce. When a node solves the cryptographic puzzle, that node may transmit the solution to the other nodes to verify the solution. In one aspect, if a majority of the nodes verify the solution, then a consensus is formed that the second block should be added to blockchain. The method 500 may include additional, fewer, or alternative actions, including those described elsewhere herein.

Exemplary Audit Compliance Via Blockchain Method

Figure 6:
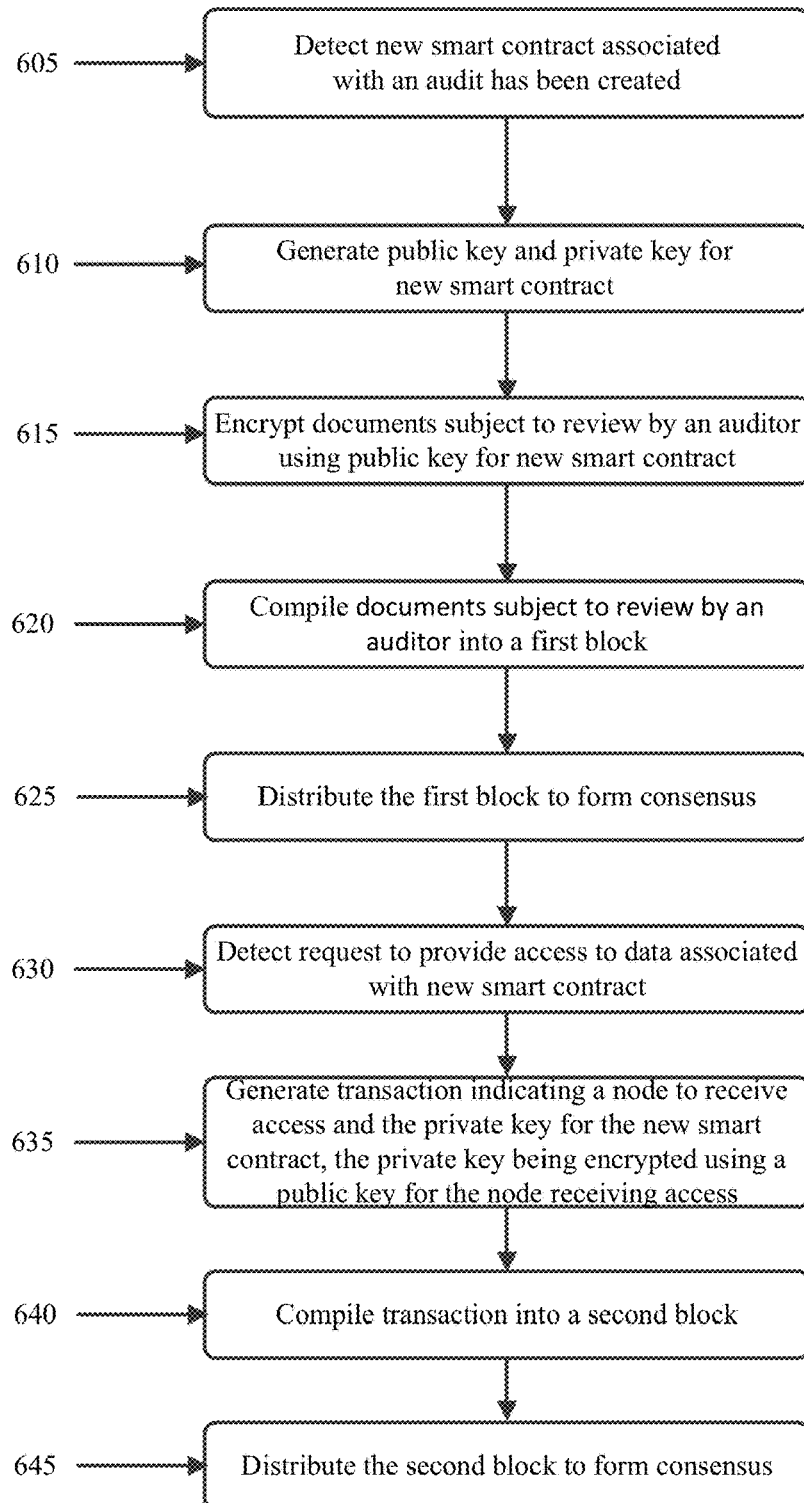
FIG. 6 depicts an exemplary computer-implemented method 600 of managing a blockchain to share information associated with an audit, in accordance with one aspect of the present disclosure.

FIG. 6 depicts a block diagram of an exemplary computer-implemented method 600 of managing a blockchain to share information associated with an audit. According to certain embodiments, the blockchain may be maintained by a plurality of nodes connected via a network, where each of the plurality of nodes may maintain a respective copy of the blockchain. The method 600 may be facilitated by a first node (such as the blockchain management node 106) of the plurality of nodes, where the first node may support execution of a dedicated application that may facilitate the functionalities of the method 600.

The method 600 may begin with the first node detecting (605) that a new smart contract associated with an audit has been created. The audit may occur in response to a decision made by a government regulator. In one aspect, the new smart contract may be created when the audit begins and/or by a party that is anticipating a future audit to occur. In some embodiments, detecting that the new smart contract has been created my include detecting a request to generate the new smart contract. In these embodiments, the first node may detect that the first node finished generating the new smart contract.

At block 610, the first node may generate a public key and a private key for the new smart contract. The public key and the private key may be generated using known asymmetric public key cryptography techniques (e.g., factorization, logarithmic, elliptic curve, etc.). In one embodiment, the first node may store the public key for the new smart contract in a public key database.

At block 615, the first node may encrypt documents subject to review by an auditor using the public key for the new smart contract. For example, the documents subject to review by an auditor may include business records, transactions, filings, and/or any other document that may be reviewed by an auditor as part of an audit. In one aspect, as additional documents subject to review as part of the audit are received by the first node over time, any additional documents may also encrypted using the private key for the new smart contract.

Accordingly, the blockchain may maintain an immutable record of documents subject to the audit. As a result, any modification to documents included in the blockchain by the party subject to the audit may be readily detected by the auditor.

At block 620, the first node may compile the documents subject to review by an auditor into a first block of the blockchain. In one aspect, the encrypted documents subject to review by an auditor may be included in a transaction that includes the encrypted documents subject to review by an auditor in the transaction data component of the transaction. In one embodiment, the first node may associate the encrypted documents subject to review by an auditor with a digital signature that is encrypted utilizing a private key for the first node. When this transaction is included in the block, any number of other transactions may also be compiled into the block as well.

At block 625, the first node may distribute the first block to one or more nodes of the blockchain. The nodes may each attempt to solve a cryptographic puzzle based upon the header for the first block and a nonce. When a node solves the cryptographic puzzle, that node may transmit the solution to the other nodes to verify the solution. In one aspect, if a majority of the nodes verify the solution, then a consensus is formed that the first block should be added to blockchain.

At block 630, the first node may detect a request to provide a particular node of the blockchain access to the documents subject to review by an auditor. The particular node may be associated with the auditor. The auditor may be either a governmental or a third-party auditor. In one embodiment, the first node may generate the request in response to a direction by the new smart contract itself. Additionally or alternatively, another node of the block chain may transmit, to the first node, the request to provide access to the documents subject to review by an auditor.

According to certain aspects, the first node may validate the request to provide access to the documents subject to review by an auditor. In one aspect, validation may involve determining a permission level associated with the node that transmitted the request (the "requesting node) and/or the particular node that is to receive access. If either the node that transmitted the request or the particular node is not associated with an appropriate permission level, the first node may discard the request. In some embodiments, the request may also include a digital signature associated with the node that transmitted the request. In these embodiments, the first node may attempt to decrypt the digital signature using a public key for the node the transmitted the request. If the first node is unable to decrypt the digital signature, the first node may discard the request.

At block 635, the first node may generate a transaction indicating both the particular node that is to receive access to the documents and the private key for the new smart contract. The first node may encrypt the private key for the new smart contract using the public key for the particular node before including the private key for the new smart contract in the transaction. In one embodiment, the first node may also include, in the transaction, a digital signature based upon the private key for the first node.

At block 640, the first node may compile the transaction including the private key for the new smart contract into a second block of the blockchain. When this transaction is included in the block, any number of other transactions may also be compiled into the block as well. It should be appreciated that although this block is referred to as a "second block," in some embodiments, the second block may be the same block as the first block.

At block 645, the first node may distribute the second block to one or more nodes of the blockchain. The nodes may each attempt to solve a cryptographic puzzle based upon the header for the second block and a nonce. When a node solves the cryptographic puzzle, that node may transmit the solution to the other nodes to verify the solution. In one aspect, if a majority of the nodes verify the solution, then a consensus is formed that the second block should be added to blockchain. The method 600 may include additional, fewer, or alternative actions, including those described elsewhere herein.

Exemplary Blockchain Filing Method

Figure 7:
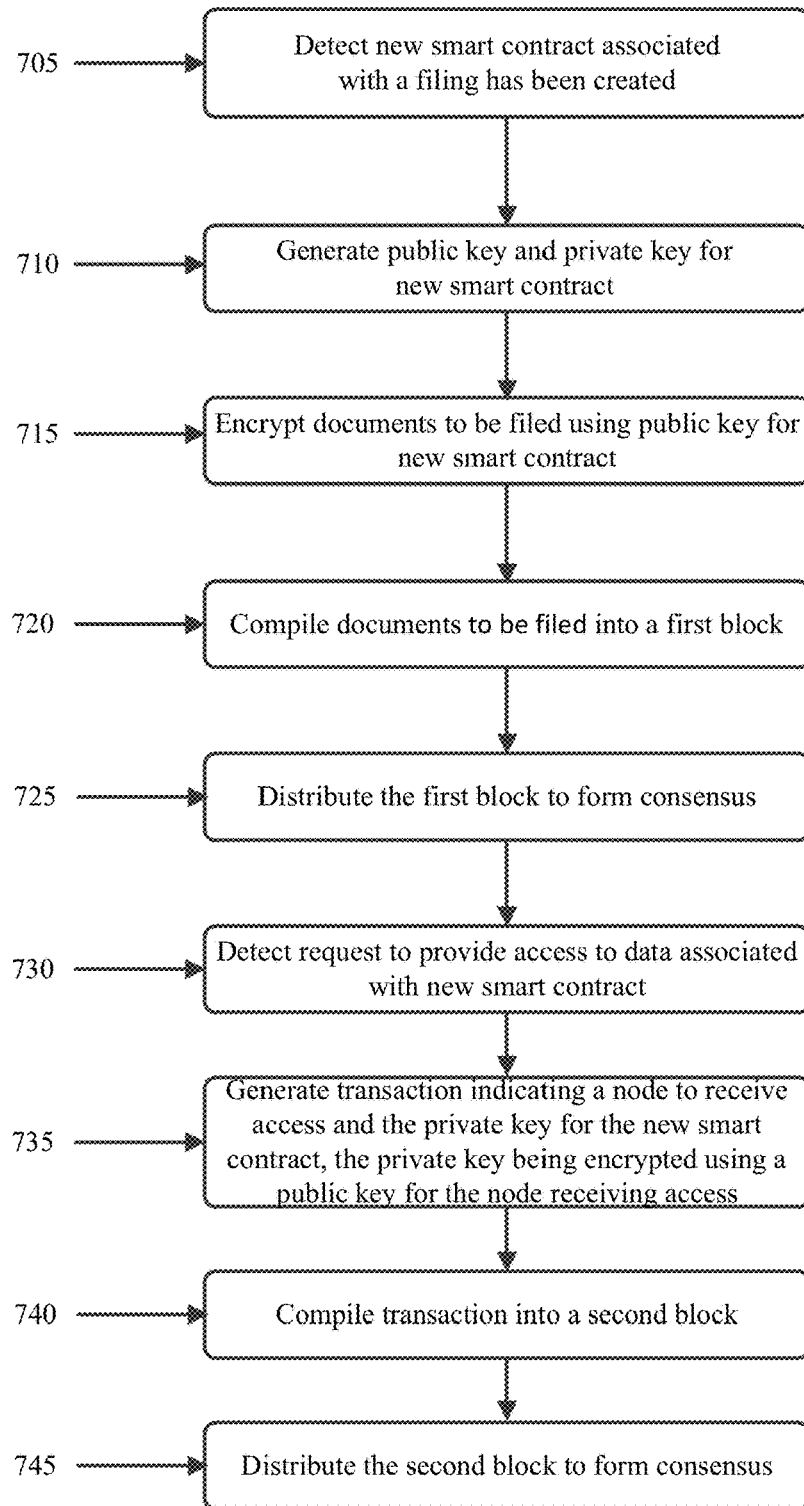
FIG. 7 depicts an exemplary computer-implemented method 700 of managing a blockchain to file documents with an agency, in accordance with one aspect of the present disclosure.

FIG. 7 depicts a block diagram of an exemplary computer-implemented method 700 of managing a blockchain to file documents with an agency. According to some embodiments, the blockchain may be maintained by a plurality of nodes connected via a network, where each of the plurality of nodes may maintain a respective copy of the blockchain. The method 700 may be facilitated by a first node (such as the blockchain management node 106) of the plurality of nodes, where the first node may support execution of a dedicated application that may facilitate the functionalities of the method 700.

The method 700 may begin with the first node detecting (705) that a new smart contract associated with a filing has been created. The filing may be any type of filing with an agency. For example, the filing may be associated with an unclaimed property, an insurance rate change, an insurance policy, and insurance application, or any other type of document that is filed with an agency. In one aspect, the new smart contract may be created when the document to be filed is created and/or when an obligation to file a document is incurred. In some embodiments, detecting that the new smart contract has been created my include detecting a request to generate the new smart contract. In these embodiments, the first node may detect that the first node finished generating the new smart contract.

At block 710, the first node may generate a public key and a private key for the new smart contract. The public key and the private key may be generated using known asymmetric public key cryptography techniques (e.g., factorization, logarithmic, elliptic curve, etc.). In one embodiment, the first node may store the public key for the new smart contract in a public key database.

At block 715, the first node may encrypt documents to be filed using the public key for the new smart contract. For example, the documents to be filed may include an unclaimed property report, an insurance policy offering, an insurance application, an insurance rate change form, or another document that is to be filed with an agency. In one aspect, the documents may be associated with a jurisdiction in which the document is to be filed. For example, in the unclaimed property context, the documents may indicate a jurisdiction associated with the unclaimed property (e.g., a location of the property and/or a location of the holder of the property). The jurisdiction may correspond to a filing deadline for filing the document. Accordingly, the new smart contract may be generate such that the documents are automatically filed based upon the filing deadline in the jurisdiction associated with the documents. In one aspect, the documents to be filed may be received contemporaneously with detecting that the new smart contract has been created (e.g., the new smart contract was generated in response to generating the document to be filed).

At block 720, the first node may compile the documents subject to review by an auditor into a first block of the blockchain. In one aspect, the encrypted documents to be filed may be included in a transaction that includes the encrypted documents to be filed in the transaction data component of the transaction. In one embodiment, the first node may associate the encrypted documents to be filed with a digital signature that is encrypted utilizing a private key for the first node. When this transaction is included in the block, any number of other transactions may also be compiled into the block as well.

At block 725, the first node may distribute the first block to one or more nodes of the blockchain. The nodes may each attempt to solve a cryptographic puzzle based upon the header for the first block and a nonce. When a node solves the cryptographic puzzle, that node may transmit the solution to the other nodes to verify the solution. In one aspect, if a majority of the nodes verify the solution, then a consensus is formed that the first block should be added to blockchain.

At block 730, the first node may detect a request to provide a particular node of the blockchain access to the documents to be filed. In one aspect, providing access to the documents to be filed may be considered filing the documents. Accordingly, the particular node may be associated with agency, such a government insurance agency, a secretary of state, or other agency at which the documents may be filed. In one embodiment, the first node may generate the request in response to a direction by the new smart contract itself. For example, the new smart contract may detect that a current day is a filing deadline (or a predetermined amount of time prior to the filing deadline) and direct the first the node to provide access to the agency. Additionally or alternatively, another node of the block chain (such as a node associated with generating the document) may transmit, to the first node, the request to provide access to the documents to file with the agency.

In one aspect, the new smart contract may also direct the performance of one or more prerequisites to filing the document. To this end, in the unclaimed property context, the new smart contract may direct that notice is sent to a last known address for the holder of the unclaimed property. Accordingly, at a predetermined amount of time prior to the filing deadline, the new smart contract may direct the first node to send the notice to the holder.

According to certain aspects, the first node may validate the request to provide access to the documents to be filed. In one aspect, validation may involve determining a permission level associated with the node that transmitted the request (the "requesting node) and/or the particular node that is to receive access. If either the node that transmitted the request or the particular node is not associated with an appropriate permission level, the first node may discard the request. In some embodiments, the request may also include a digital signature associated with the node that transmitted the request. In these embodiments, the first node may attempt to decrypt the digital signature using a public key for the node the transmitted the request. If the first node is unable to decrypt the digital signature, the first node may discard the request.

At block 735, the first node may generate a transaction indicating both the particular node that is to receive access to the documents to be filed and the private key for the new smart contract. The first node may encrypt the private key for the new smart contract using the public key for the particular node before including the private key for the new smart contract in the transaction. In one embodiment, the first node may also include, in the transaction, a digital signature based upon the private key for the first node.

At block 740, the first node may compile the transaction including the private key for the new smart contract into a second block of the blockchain. When this transaction is included in the block, any number of other transactions may also be compiled into the block as well. It should be appreciated that although this block is referred to as a "second block," in some embodiments, the second block may be the same block as the first block.

At block 745, the first node may distribute the second block to one or more nodes of the blockchain. The nodes may each attempt to solve a cryptographic puzzle based upon the header for the second block and a nonce. When a node solves the cryptographic puzzle, that node may transmit the solution to the other nodes to verify the solution. In one aspect, if a majority of the nodes verify the solution, then a consensus is formed that the second block should be added to blockchain. The method 700 may include additional, fewer, or alternative actions, including those described elsewhere herein.

Exemplary Fund Transfers Via Blockchain Method

Figure 8:
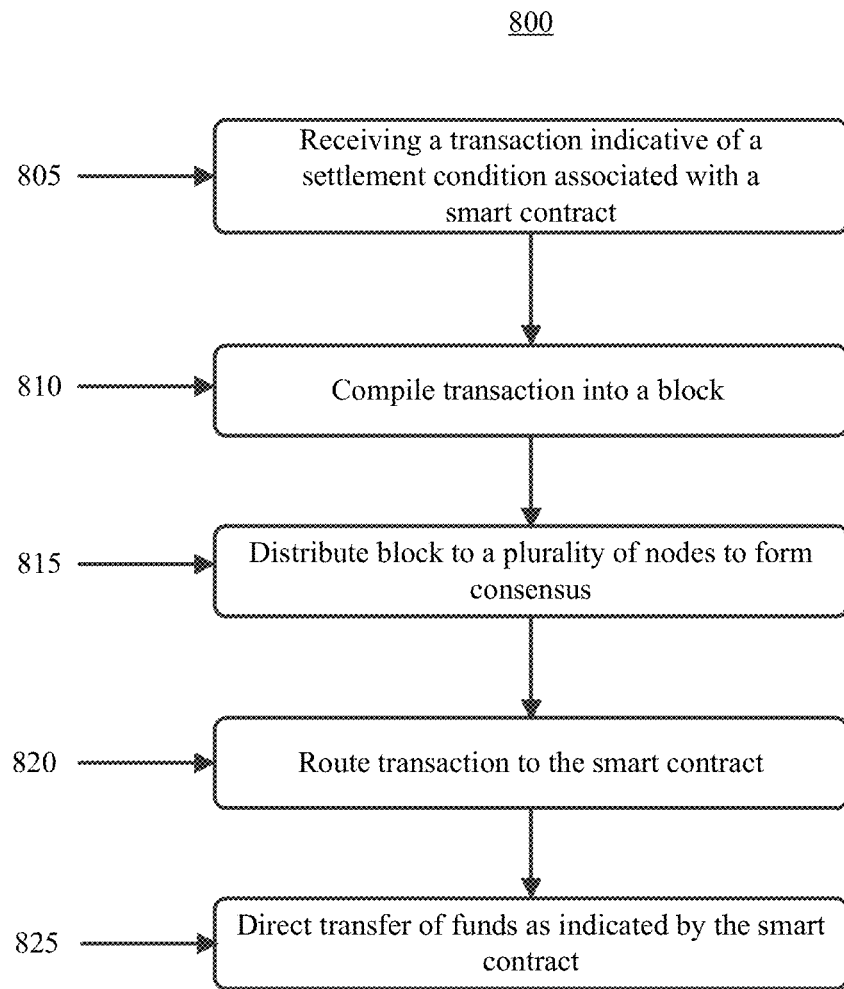
FIG. 8 depicts an exemplary computer-implemented method 800 of managing a blockchain to automatically transfer funds, such as when a payment obligation is resolved, in accordance with one aspect of the present disclosure.

FIG. 8 depicts a block diagram of an exemplary computer-implemented method 800 of managing a blockchain to automatically transfer funds, such as when a payment obligation is resolved. According to certain embodiments, the blockchain may be maintained by a plurality of nodes connected via a network, where each of the plurality of nodes may maintain a respective copy of the blockchain. The method 800 may be facilitated by a first node (such as the blockchain management node 106) of the plurality of nodes, where the first node may support execution of a dedicated application that may facilitate the functionalities of the method 800.

The method 800 may begin with the first node receiving (805) a transaction indicative of a settlement condition associated with a smart contract. For example, the smart contract may relate to a claim between a payor and a payee. To this end, the smart contract may be configured such that funds are not transferred to satisfy the settlement obligation unless certain conditions exist. In one embodiment, the claim may be an insurance claim that is to be paid out by an insurer or a subrogation party. In other embodiments, the claim may be any other type of payment obligation. Further, the settlement condition may include resolving a liability dispute, verifying one or more documents, receiving an approval, and/or any other condition that, upon satisfaction, causes a settlement obligation to be fulfilled.

According to certain aspects, the first node may verify the transaction including the settlement condition. In one aspect, verification may involve determining a permission level associated with the node that transmitted the transaction. If the node that transmitted the transaction is not associated with an appropriate permission level, the first node may discard the transaction. In some embodiments, the transaction may also include a digital signature associated with the node that transmitted the transaction. In these embodiments, the first node may attempt to decrypt the digital signature using a public key for the node the transmitted the transaction. If the first node is unable to decrypt the digital signature, the first node may discard the transaction.

At block 810, the first node may compile the transaction into a block of the blockchain. When this transaction is included in the block, any number of other transactions may also be compiled into the block as well. In some embodiments, the block is compiled periodically (e.g., every five minutes, ten minutes, hour) or aperiodically (e.g., in response to receiving a threshold number of transactions).

At block 815, the first node may distribute the block to one or more nodes of the blockchain. The nodes may each attempt to solve a cryptographic puzzle based upon the header for the second block and a nonce. When a node solves the cryptographic puzzle, that node may transmit the solution to the other nodes to verify the solution. In one aspect, if a majority of the nodes verify the solution, then a consensus is formed that the block should be added to blockchain.

At block 820, after consensus is formed, the first node may route the transaction to the smart contract. More particularly, the first node may extract an identity of the smart contract from the identification component of the transaction and input the settlement condition to the indicated smart contract. In one aspect, the settlement condition is in a standardized format (e.g., a claim status flag indicating a state of "APPROVED," for example). The settlement condition may be included in the transaction information component of the transaction. In response to the input of the settlement condition, the smart contract may direct the first node to transfer funds from a payor indicated by the smart contract to a payee indicated by the smart contract.

At block 825, the first node may automatically direct the performance of the action indicated by the smart contract. In this case, the action may be a transfer of an amount of funds indicated by the smart contract from the payor to the payee. To direct the payment, the first node may generate a fund transfer transaction that indicates the funds should be transferred. In one aspect, the first node may apply a digital signature to the fund transfer transaction, the digital signature based being encrypted based upon a private key for the first node. Similar to the processing the transaction including the payment condition, the first node may compile a block that includes the fund transfer transaction and distribute the block to a plurality of nodes to form a consensus on including the block in the block chain.

According to certain aspects, upon forming a consensus on this block, a second node of the block chain may detect the fund transfer transaction. The second node may be interconnected to an electronic wire service capable of actually transferring funds from the payor account to a payee account. Prior to executing the transfer, the second node may verify the fund transfer transaction in a similar manner to the first node verifying the transaction including the payment condition. In one embodiment, upon verifying the transaction, the second node may execute the fund transfer utilizing the electronic wire service. According to some aspects, upon a successful fund transfer, the second node may generate a transaction that indicates the fund transfer is complete. The method 800 may include additional, fewer, or alternative actions, including those described elsewhere herein.

Exemplary Anti-Money Laundering Compliance Via Blockchain Method

Figure 9:
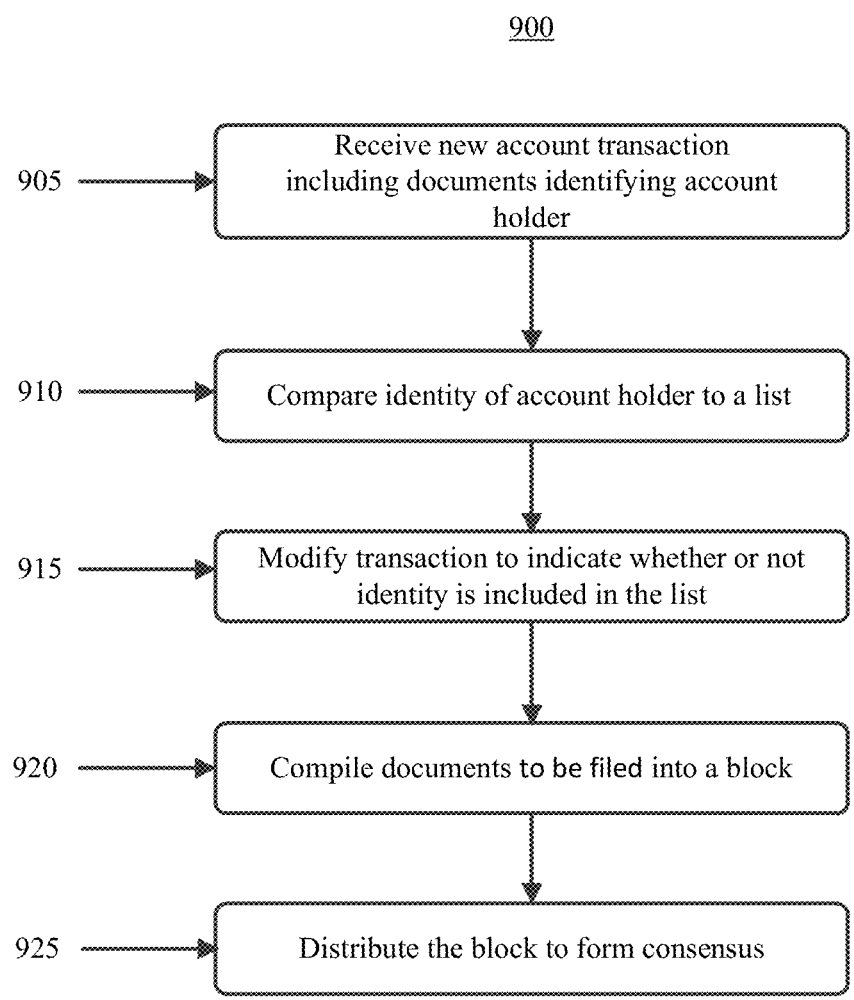
FIG. 9 depicts an exemplary computer-implemented method 900 of managing a blockchain to comply with customer identification requirements associated with anti-money laundering regulations, in accordance with one aspect of the present disclosure.

FIG. 9 depicts a block diagram of an exemplary computer-implemented method 900 of managing a blockchain to comply with customer identification requirements associated with anti-money laundering regulations. According to some embodiments, the blockchain may be maintained by a plurality of nodes connected via a network, where each of the plurality of nodes may maintain a respective copy of the blockchain. The method 900 may be facilitated by a first node (such as the blockchain management node 106) of the plurality of nodes, where the first node may support execution of a dedicated application that may facilitate the functionalities of the method 900.

The method 900 may begin with the first node receiving (905) a new account transaction. The new account transaction may be generated in response to an account holder attempting to open up a new account. According to certain aspects, the new account transaction may include one or more documents identifying the account holder. For individuals, the one or more documents may include a driver's license, a passport, or an alien identification card. For corporate entities, the one or more documents may include an articles of incorporation, a partnership agreement, or a state-issued business license. In one aspect, the first node may compare to the one or more documents to detect a discrepancy between one or more of the one or more documents. If the first node detects a discrepancy, the first node may modify the new account transaction to include an indication of the discrepancy.

According to some aspects, in response to receiving the new account transaction, the first node may generate a new smart contract associated with opening the new account. The first node may generate a public key and a private key for the new smart contract. The public key and the private key may be generated using known asymmetric public key cryptography techniques (e.g., factorization, logarithmic, elliptic curve, etc.). In one embodiment, the first node may store the public key for the new smart contract in a public key database. Further, the first node may encrypt the documents included in the new account transaction using the public key for the new smart contract. Additionally or alternatively, the first node may apply a digital signature to the new account transaction, the digital signature being encrypted based upon a private key for the first node.

At block 910, the first node may compare an identity of the account holder to one or more lists of identities promulgated by a government and/or (inter-)governmental agency. For example, the U.N. or a department of defense may publish lists of entities with suspected links to terrorism and/or that are subject to sanctions.

At block 915, the first node may modify the new account transaction to include an indication of whether or not the identity of the account holder is included in the one or more lists. In one aspect, the customer identification requirements may including maintaining information on all account holders attempting to open a new account, regardless if the new account is actually opened. Accordingly, even if the identity is included in a list, the first node may proceed with including the new account transaction in the blockchain.

At block 920, the first node may compile the new account transaction into a block of the blockchain. When this transaction is included in the block, any number of other transactions may also be compiled into the block as well. In some embodiments, the block is compiled periodically (e.g., every five minutes, ten minutes, hour) or aperiodically (e.g., in response to receiving a threshold number of transactions).

At block 925, the first node may distribute the block to one or more nodes of the blockchain. The nodes may each attempt to solve a cryptographic puzzle based upon the header for the second block and a nonce. When a node solves the cryptographic puzzle, that node may transmit the solution to the other nodes to verify the solution. In one aspect, if a majority of the nodes verify the solution, then a consensus is formed that the block should be added to blockchain.

According to certain aspects, a second node may detect that the block including the new account transaction has been added to the blockchain. In response, the second node may analyze the data included in new account transaction, including the determination of whether or not the identity of the account holder is included in a list. If the identity is not included in a list, the second node may approve the opening of the new account. On the other hand, if the identity is included in a list, the second node may reject the account holder from opening the new account. The method 900 may include additional, fewer, or alternative actions, including those described elsewhere herein.

Exemplary Blockchain Based Payments

Figure 10:
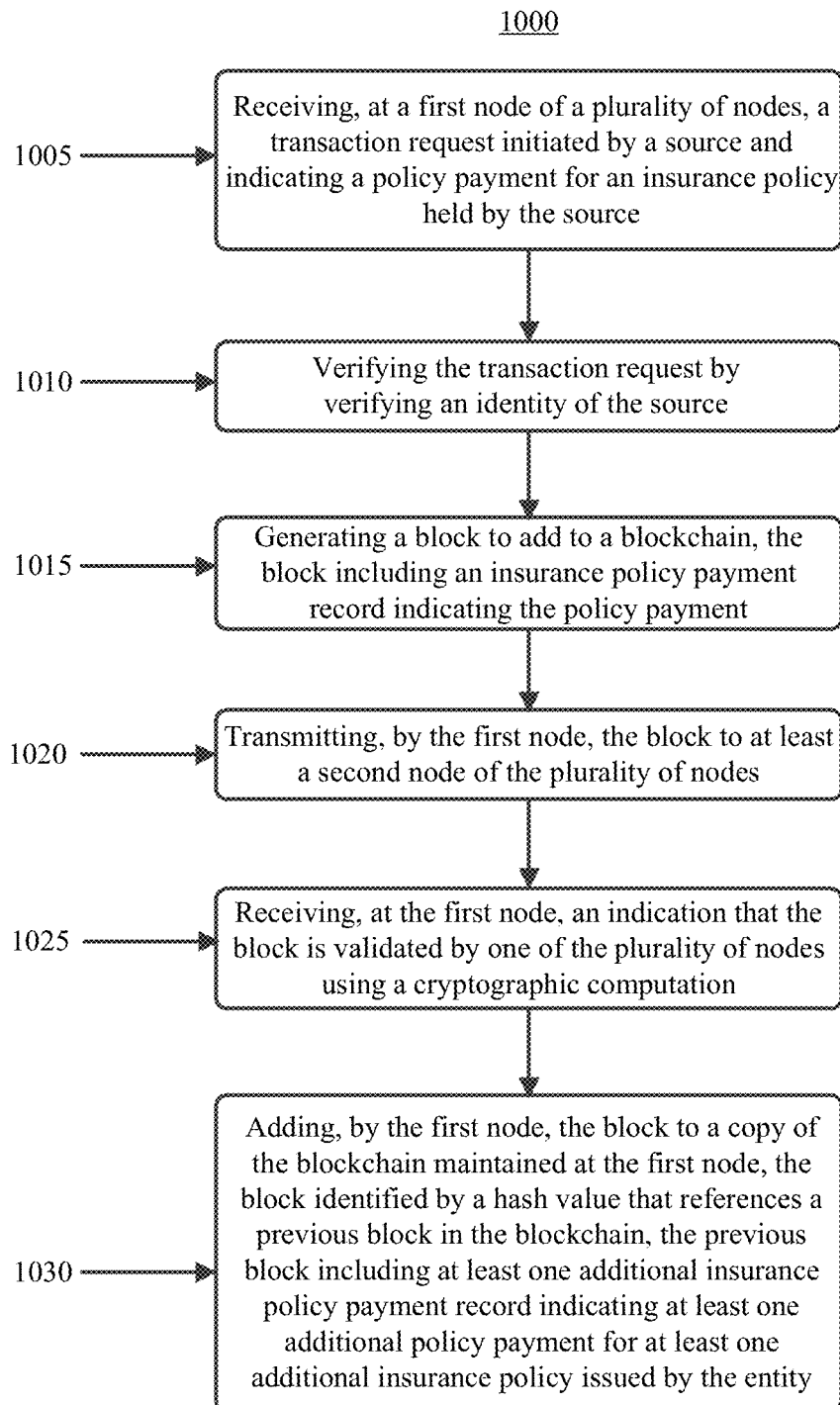
FIG. 10 depicts an exemplary computer-implemented method 1000 of processing a blockchain comprising a plurality of immutable insurance policy payment records corresponding to insurance policies issued by an entity, in accordance with one aspect of the present disclosure.

FIG. 10 depicts a block diagram of an exemplary computer-implemented method 1000 of processing a blockchain comprising a plurality of immutable insurance policy payment records corresponding to insurance policies issued by an entity. According to certain embodiments, the blockchain may be maintained by a plurality of nodes connected via a network, where each of the plurality of nodes may maintain a respective copy of the blockchain. The method 1000 may be facilitated by a first node of the plurality of nodes, where the first node may support execution of a dedicated application that may facilitate the functionalities of the method 1000.

The method 1000 may begin with the first node receiving (1005) a transaction request initiated by a source and indicating a policy payment for an insurance policy held by the source. In certain embodiments, the policy payment may be a periodic payment (e.g., a monthly payment) that may be necessary to keep the insurance policy in force.

At block 1010, the first node may verify the transaction request by verifying an identify of the source. In one embodiment, the first node may access a consensus rule associated with the transaction request and shared by the plurality of nodes, where the consensus rule may indicate a set of authorized sources. Further, the first node may verify the transaction request based upon determining that the source is included in the set of authorized sources. In another embodiment, the first node may determine that an existing block of the copy of the blockchain maintained by the first node indicates the identity of the source.

In a further embodiment, the first node may receive, via the network from at least a portion of the plurality of nodes, an indication that the transaction request is verified, and/or may verify that the source is in good standing with the entity. Additionally, in one embodiment, the transaction request may include a digital signature associated with the source, where the first node may authenticate the source of the transaction request using the digital signature.

As an additional embodiment, the first node may have a permission level, where the first node may determine, based upon the permission level, that the first node has sufficient permission to submit the transaction request. In another embodiment, the first node may add the transaction request to a queue of pending transactions and detect that at least one of the nodes of the plurality of nodes verified the identity of the source.

At block 1015, the first node may generate a block to add to a blockchain, where the block may include an insurance policy payment record indicating the policy payment. In some embodiments, the policy payment may reflect payment using a cryptocurrency. At block 1020, the first node may transmit the block to at least a second node of the plurality of nodes. In certain embodiments, the second node may transmit the block to at least a third node of the plurality of nodes.

At block 1025, the first node may receive an indication that the block is validated by one of the plurality of nodes using a cryptographic computation. In certain embodiments, the first node (and any additional node of the plurality of nodes other than the one node that validated the block) may confirm the validation. At block 1030, the first node may add the block to a copy of the blockchain maintained by the first node, where the block may be identified by a hash value that references a previous block in the blockchain, and the previous block may include at least one additional insurance policy payment record indicating at least one additional policy payment for at least one additional insurance policy issued by the entity. The method 1000 may include additional, fewer, or alternative actions, including those described elsewhere herein.

Exemplary Interest Validation Via Blockchain

Figure 11:
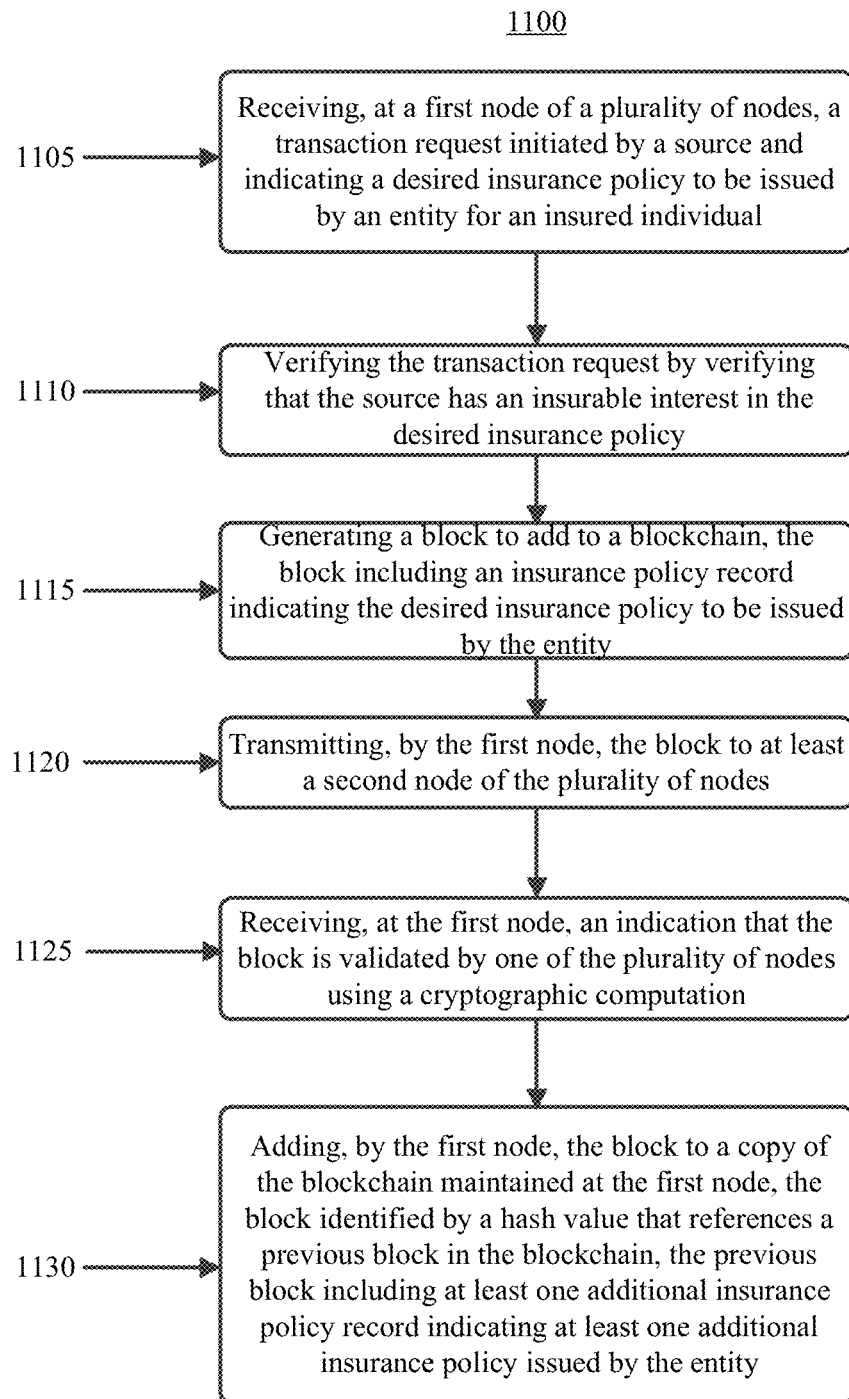
FIG. 11 depicts an exemplary computer-implemented method 1100 of processing a blockchain comprising a plurality of insurance policy records corresponding to insurance policies issued by an entity, in accordance with one aspect of the present disclosure.

FIG. 11 depicts a block diagram of an exemplary computer-implemented method 1100 of processing a blockchain comprising a plurality of insurance policy records corresponding to insurance policies issued by an entity. According to some embodiments, the blockchain may be maintained by a plurality of nodes connected via a network, where each of the plurality of nodes may maintain a respective copy of the blockchain. The method 1100 may be facilitated by a first node of the plurality of nodes, where the first node may support execution of a dedicated application that may facilitate the functionalities of the method 1100.

The method 1100 may begin with the first node receiving (1105) a transaction request initiated by a source and indicating a desired insurance policy to be issued by the entity for an insured individual. In certain embodiments, the desired insurance policy may be a life insurance policy or other type of insurance policy where the policy holder has an insurable interest (i.e., a financial or other kind of benefit from the continuous existence, without impairment or damage, of the insured object or individual).

At block 1110, the first node may verify the transaction request by verifying that the source has an insurable interest in the desired insurance policy. In one embodiment, the first node may access a consensus rule associated with the transaction request and shared by the plurality of nodes, where the consensus rule may associate a set of sources with a set of individuals. Further, the first node may verify the transaction request based upon determining, from the consensus rule, (i) that the source is included in the set of sources, and (ii) the insured individual is included in the set of individuals, and (iii) the source is associated with the insured individual. In another embodiment, the consensus rule may further indicate a set of authorized sources, and the first node may verify the transaction request by determining that the source is included in the set of authorized sources. Additionally, in one embodiment, the first node may determine that an existing block of the copy of the blockchain maintained by the first node indicates the identity of the source.

In a further embodiment, the first node may receive, via the network from at least a portion of the plurality of nodes, an indication that the transaction request is verified, and/or may verify that the source is in good standing with the entity. Additionally, in one embodiment, the transaction request may include a digital signature associated with the source, where the first node may authenticate the source of the transaction request using the digital signature.

As an additional embodiment, the first node may have a permission level, where the first node may determine, based upon the permission level, that the first node has sufficient permission to submit the transaction request. In another embodiment, the first node may add the transaction request to a queue of pending transactions and detect that at least one of the nodes of the plurality of nodes verified the identity of the source.

At block 1115, the first node may generate a block to add to a blockchain, where the block may include an insurance policy record indicating the desired insurance policy to be issued by the entity. In some embodiments, the insurance policy record may include additional information or data associated with the desired insurance policy.

At block 1120, the first node may transmit the block to at least a second node of the plurality of nodes. In some embodiments, the second node may transmit the block to at least a third node of the plurality of nodes.

At block 1125, the first node may receive an indication that the block is validated by one of the plurality of nodes using a cryptographic computation. In some embodiments, the first node (and any additional node of the plurality of nodes other than the one node that validated the block) may confirm the validation. At block 1130, the first node may add the block to a copy of the blockchain maintained by the first node, where the block may be identified by a hash value that references a previous block in the blockchain, and the previous block may include at least one additional insurance policy record indicating at least one additional insurance policy issued by the entity. The method 1100 may include additional, fewer, or alternative actions, including those described elsewhere herein.

Exemplary Industry Reporting Via Blockchain

Figure 12:
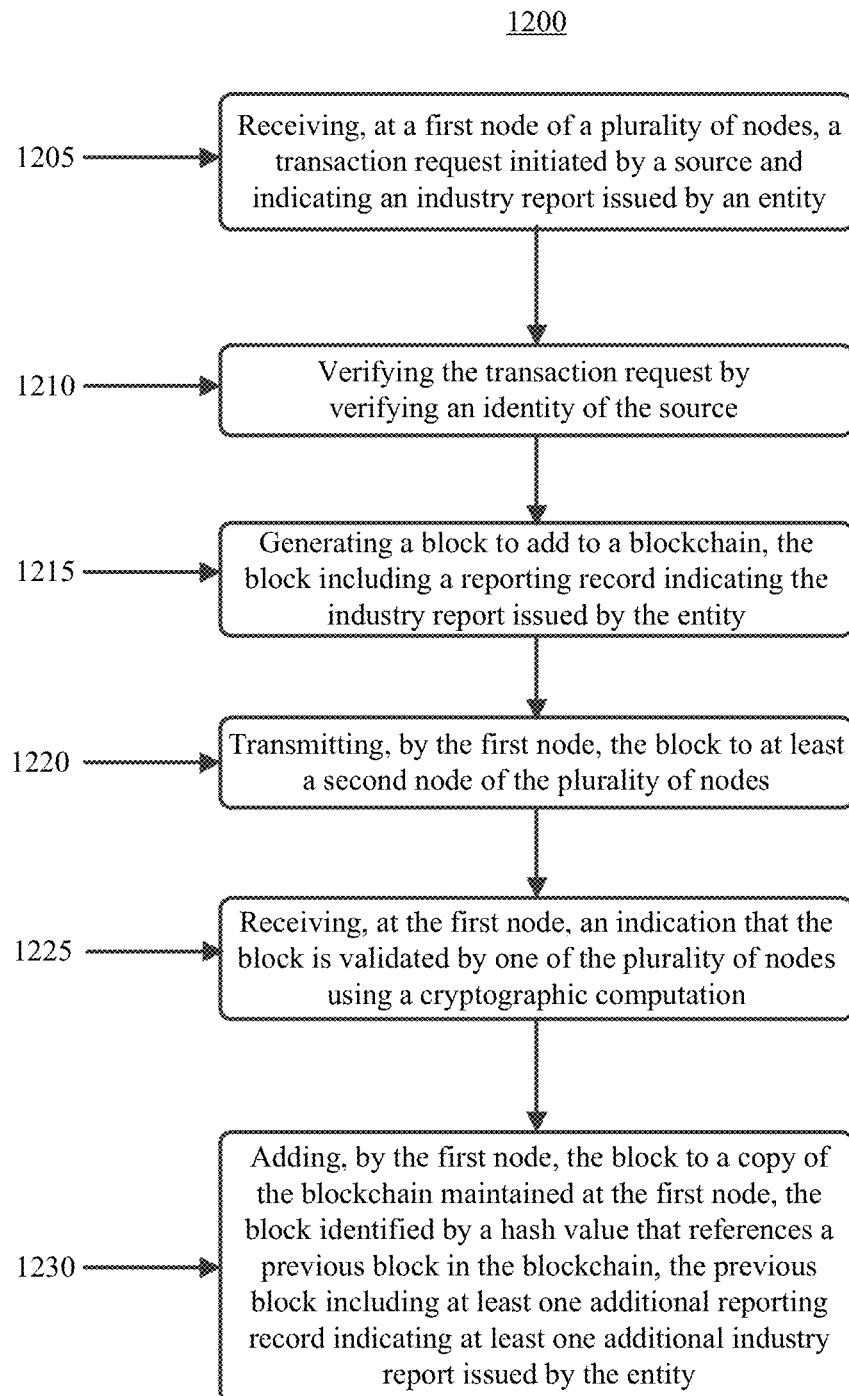
FIG. 12 depicts an exemplary computer-implemented method 1200 of processing a blockchain comprising a plurality of immutable reporting records corresponding to industry reports issued by an entity, in accordance with one aspect of the present disclosure.

FIG. 12 depicts a block diagram of an exemplary computer-implemented method 1200 of processing a blockchain comprising a plurality of immutable reporting records corresponding to industry reports issued by an entity. According to certain embodiments, the blockchain may be maintained by a plurality of nodes connected via a network, where each of the plurality of nodes may maintain a respective copy of the blockchain. The method 1200 may be facilitated by a first node of the plurality of nodes, where the first node may support execution of a dedicated application that may facilitate the functionalities of the method 1200.

The method 1200 may begin with the first node receiving (1205) a transaction request initiated by a source and indicating an industry report issued by the entity. In some embodiments, the industry report may be any official or unofficial document that may be associated with a study, investigation, or other type of report.

At block 1210, the first node may verify the transaction request by verifying an identify of the source. In one embodiment, the first node may access a consensus rule associated with the transaction request and shared by the plurality of nodes, where the consensus rule may indicate a set of authorized sources. Further, the first node may verify the transaction request based upon determining that the source is included in the set of authorized sources. In another embodiment, the first node may determine that an existing block of the copy of the blockchain maintained by the first node indicates the identity of the source.

In a further embodiment, the first node may receive, via the network from at least a portion of the plurality of nodes, an indication that the transaction request is verified, and/or may verify that the source is in good standing with the entity. Additionally, in one embodiment, the transaction request may include a digital signature associated with the source, where the first node may authenticate the source of the transaction request using the digital signature.

As an additional embodiment, the first node may have a permission level, where the first node may determine, based upon the permission level, that the first node has sufficient permission to submit the transaction request. In another embodiment, the first node may add the transaction request to a queue of pending transactions and detect that at least one of the nodes of the plurality of nodes verified the identity of the source.

At block 1215, the first node may generate a block to add to a blockchain, where the block may include a reporting record indicating the industry report issued by the entity. At block 1220, the first node may transmit the block to at least a second node of the plurality of nodes. In some embodiments, the second node may transmit the block to at least a third node of the plurality of nodes.

At block 1225, the first node may receive an indication that the block is validated by one of the plurality of nodes using a cryptographic computation. In certain embodiments, the first node (and any additional node of the plurality of nodes other than the one node that validated the block) may confirm the validation. At block 1230, the first node may add the block to a copy of the blockchain maintained by the first node, where the block may be identified by a hash value that references a previous block in the blockchain, and the previous block may include at least one additional reporting record indicating at least one additional industry report issued by the entity. The method 1200 may include additional, fewer, or alternative actions, including those described elsewhere herein.

Exemplary Agent Sales Data Via Blockchain

Figure 13:
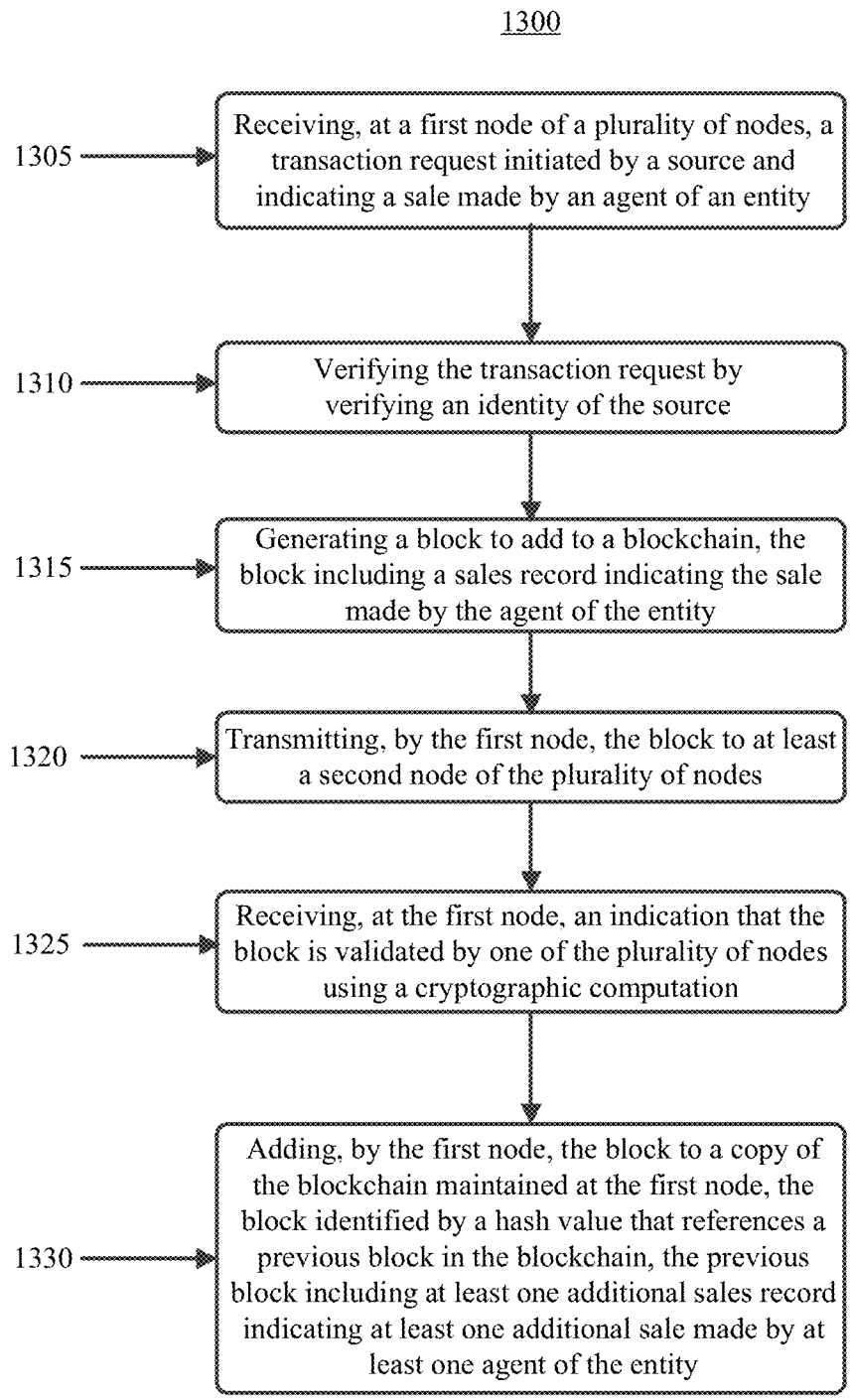
FIG. 13 depicts an exemplary computer-implemented method 1300 of processing a blockchain comprising a plurality of immutable sales records corresponding to sales made by agents of an entity, in accordance with one aspect of the present disclosure.

FIG. 13 depicts a block diagram of an exemplary computer-implemented method 1300 of processing a blockchain comprising a plurality of immutable sales records corresponding to sales made by agents of an entity. According to certain embodiments, the blockchain may be maintained by a plurality of nodes connected via a network, where each of the plurality of nodes may maintain a respective copy of the blockchain. The method 1300 may be facilitated by a first node of the plurality of nodes, where the first node may support execution of a dedicated application that may facilitate the functionalities of the method 1300.

The method 1300 may begin with the first node receiving (1305) a transaction request initiated by a source and indicating a sale made by an agent of the entity. In some embodiments, the sale may reflect a transaction, facilitated by the agent, of a good, service, policy, and/or the like that is offered by the entity.

At block 1310, the first node may verify the transaction request by verifying an identify of the source. In one embodiment, the first node may access a consensus rule associated with the transaction request and shared by the plurality of nodes, where the consensus rule may indicate a set of authorized sources. Further, the first node may verify the transaction request based upon determining that the source is included in the set of authorized sources. In another embodiment, the first node may determine that an existing block of the copy of the blockchain maintained by the first node indicates the identity of the source.

In a further embodiment, the first node may receive, via the network from at least a portion of the plurality of nodes, an indication that the transaction request is verified, and/or may verify that the source is in good standing with the entity. Additionally, in one embodiment, the transaction request may include a digital signature associated with the source, where the first node may authenticate the source of the transaction request using the digital signature.

As an additional embodiment, the first node may have a permission level, where the first node may determine, based upon the permission level, that the first node has sufficient permission to submit the transaction request. In another embodiment, the first node may add the transaction request to a queue of pending transactions and detect that at least one of the nodes of the plurality of nodes verified the identity of the source.

At block 1315, the first node may generate a block to add to a blockchain, where the block may include a sales record indicating the sale made by the agent of the entity. At block 1320, the first node may transmit the block to at least a second node of the plurality of nodes. In some embodiments, the second node may transmit the block to at least a third node of the plurality of nodes.

At block 1325, the first node may receive an indication that the block is validated by one of the plurality of nodes using a cryptographic computation. In certain embodiments, the first node (and any additional node of the plurality of nodes other than the one node that validated the block) may confirm the validation. At block 1330, the first node may add the block to a copy of the blockchain maintained by the first node, where the block may be identified by a hash value that references a previous block in the blockchain, and the previous block may include at least one additional sales record indicating at least one additional sale made by at least one agent of the entity. The method 1300 may include additional, fewer, or alternative actions, including those described elsewhere herein.

Exemplary Blockchain Management Node

Figure 14:
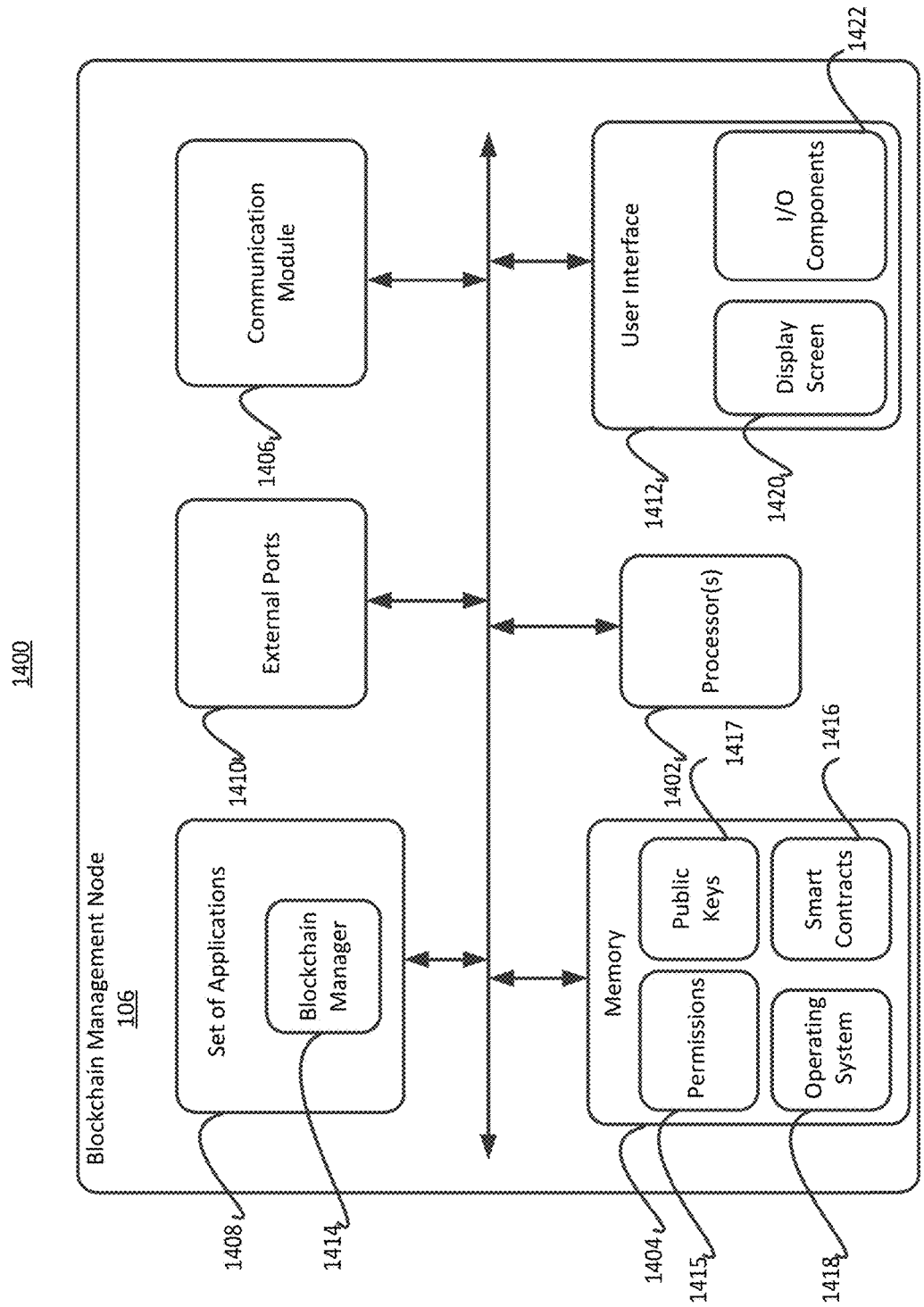
FIG. 14 illustrates a block diagram of an exemplary node of a blockchain that implements various functionality described herein.

FIG. 14 illustrates a diagram of an exemplary blockchain management node 106 in which the functionalities as discussed herein may be implemented. It should be appreciated that the blockchain management node 106 may be associated with a distributed ledger that governs a plurality of smart contracts, as discussed elsewhere herein.

The blockchain management node 106 may include a processor 1402, as well as a memory 1404. The memory 1404 may store an operating system 1418 capable of facilitating the functionalities as described herein. The blockchain management node 106 may also store a set of applications 1408 (i.e., machine readable instructions). For example, one application of the set of applications 1408 may be a blockchain manager 1414 configured to compile transactions into blocks, to route transactions to smart contracts, and/or perform various other functionality described elsewhere herein. It should be appreciated that other applications may be included in the set of applications 1408.

The processor 1402 may interface with the memory 1404 to execute the operating system 1418 and the set of applications 1408. According to some embodiments, the memory 1404 may also include a plurality of smart contracts 1416, a plurality of public keys (for nodes and/or smart contracts) 1417, and/or a set of permission 1415 associated with each node. The blockchain manager 1414 may access the smart contracts 1416 to facilitate the enforcement of the smart contracts 1416. Additionally, the blockchain manager 1414 may interact with the public keys 1417 and the permissions 1415 to ensure data security and/or restrict unauthorized access to data. The memory 1404 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The blockchain management node 106 may further include a communication module 1406 configured to communicate data via one or more networks. According to some embodiments, the communication module 1406 may include one or more transceivers (e.g., WWAN, WLAN, and/or WPAN transceivers) functioning in accordance with IEEE standards, 3GPP standards, or other standards, and configured to receive and transmit data via one or more external ports 1410. The blockchain management node 106 may further include a user interface 1412 configured to present information to a user and/or receive inputs from the user. As shown in FIG. 14, the user interface 1412 may include a display screen 1420 and I/O components 1422 (e.g., ports, capacitive or resistive touch sensitive input panels, keys, buttons, lights, LEDs, speakers, microphones).

According to the present embodiments, the user may access the blockchain management node 106 via the user interface 1412 to monitor the distributed ledger, update software executing at the blockchain management node 106 and/or perform other functions. In some embodiments, the blockchain management node 106 may perform the functionalities as discussed herein as part of a "cloud" network, or may otherwise communicate with other hardware or software components within the cloud to send, retrieve, and/or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the processor 1402 (e.g., working in connection with the operating system 1418) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Additional Considerations

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

At various points herein, methods have been described as involving a first, second, and/or third block of a blockchain. It should be appreciated that the labels first, second, and third are used for ease of explanation and does not necessarily imply the involvement of multiple blocks. To this end, all transactions described as being included in a first, second, and/or third block may, in implementations, be included in just a single block of the blockchain.

Additionally, although the systems and methods described herein describe functionality at particular nodes of the blockchain, such descriptions are done for ease of explanation. To this end, any functionally described as occurring at two separate nodes may be implemented at a single node. Similarly, any functionality described as occurring at a single node, may be implemented across any number of nodes.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In some embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method of providing access to confidential data stored in a blockchain, the blockchain relating to a plurality of smart contracts, the method comprising:
    detecting, by one or more processors, that a new smart contract has been created for inclusion in the plurality of smart contracts;
    detecting, by the one or more processors, a request to provide a particular node access to encrypted data associated with the new smart contract, the request indicating the particular node;
    determining, by the one or more processors, that a permission level associated with the particular node indicates that the particular node is permitted to access information associated with an insurance policy;
    in response to the determination, generating, by the one or more processors, a transaction indicating (i) a private key for the new smart contract, the private key for the new smart contract being encrypted using a public key for the particular node, and (ii) an identity of the particular node;
    applying, by the one or more processors, a digital signature of a node associated with the one or more processors to the transaction, the digital signature being generated based upon a second private key for a node associated with the one or more processors;
    compiling, by the one or more processors, the transaction into a block of transactions; and
    distributing, by the one or more processors, the block to the plurality of nodes to form a consensus on an update to the blockchain.

2. The computer-implemented method of claim 1, data associated with the new smart contract includes information associated with an electronic medical record.

3. The computer-implemented method of claim 1, data associated with the new smart contract includes information associated with at least one of an insurance policy, a lab result, a form, or a confidential communication.

4. The computer-implemented method of claim 1, wherein the particular node is associated with an attorney or an estate planner.

5. The computer-implemented method of claim 1, wherein the encrypted data associated with the new smart contract is encrypted using a public key corresponding to the private key for the new smart contract.

6. The computer-implemented method of claim 1, wherein detecting the request to provide access to the data further comprises:
    receiving, at the one or more processors, the request from a requesting node;
    determining, by the one or more processors, a permission level associated with the requesting node; and
    generating, by the one or more processors, the transaction when the permission level indicates that the requesting node is permitted to request that other nodes receive access to information associated with an insurance policy.

7. The computer-implemented method of claim 1, wherein detecting the request to provide access to the data further comprises:
    generating, by the one or more processors, the request to provide access to the data associated upon being directed by the new smart contract.

8. A computer system for providing access to confidential data stored in a blockchain, the blockchain relating to a plurality of smart contracts, the computer system comprising:
    one or more processors;
    a communication module adapted to communicate with a plurality of nodes;
    a non-transitory program memory coupled to the one or more processors and storing executable instructions that, when executed by the one or more processors, cause the computer system to:
        detect that a new smart contract has been created for inclusion in the plurality of smart contracts;
        detect a request to provide a particular node access to encrypted data associated with the new smart contract, the request indicating the particular node;
        determine that a permission level associated with the particular node indicates that the particular node is permitted to access information associated with an insurance policy;
        in response to the determination, generate a transaction indicating (i) a private key for the new smart contract, the private key for the new smart contract being encrypted using a public key for the particular node, and (ii) an identity of the particular node;

apply a digital signature to the transaction, the digital signature being generated based upon a second private key for a node associated with the one or more processors;
compile the transaction into a block of transactions; and
distribute, via the communication module, the block to the plurality of nodes to form a consensus on an update to the blockchain.

9. The computer system of claim 8, wherein data associated with the new smart contract includes an electronic medical record.

10. The computer system of claim 8, wherein data associated with the new smart contract includes at least one of an insurance policy, a lab result, a form, or a confidential communication.

11. The computer system of claim 8, wherein the particular node is associated with an attorney or an estate planner.

12. The computer system of claim 8, wherein the encrypted data associated with the new smart contract is encrypted using a public key corresponding to the private key for the new smart contract.

13. The computer system of claim 8, wherein to detect the request to provide access to the data, the instructions, when executed, cause the computer system to:
receive the request from a requesting node;
determine a permission level associated with the requesting node; and
generate the transaction when the permission level indicates that the requesting node is permitted to request that other nodes receive access to information associated with an insurance policy.

14. The computer system of claim 8, wherein to detect the request to provide access to the data, the instructions, when executed, cause the computer system to:
generate the request to provide access to the data upon being directed by the new smart contract.

15. A non-transitory computer readable storage medium storing processor-executable instructions, that, when executed, cause one or more processors to:
detect that a new smart contract has been created;
detect a request to provide a particular node access to encrypted data associated with the new smart contract, the request indicating the particular node;
determine that a permission level associated with the particular node indicates that the particular node is permitted to access information associated with an insurance policy;
in response to the determination, generate a transaction indicating (i) a private key for the new smart contract, the private key for the new smart contract being encrypted using a public key for the particular node, and (ii) an identity of the particular node;
apply a digital signature to the transaction, the digital signature being generated based upon a second private key for a node associated with the one or more processors;
compile the transaction into a block of transactions; and
distribute the block to the plurality of nodes to form a consensus on an update to the blockchain.

16. A computer-implemented method of providing access to confidential data stored in a blockchain, the blockchain relating to a plurality of smart contracts, the method comprising:

detecting, by one or more processors, that a new smart contract has been created for inclusion in the plurality of smart contracts;
receiving, by the one or more processors, a request from a requesting node to provide a particular node access to encrypted data associated with the new smart contract, the request indicating the particular node;
determining, by the one or more processors, that a permission level associated with the requesting node indicates that the requesting node is permitted to request that other nodes receive access to information associated with an insurance policy;
in response to the determination, generating, by the one or more processors, a transaction indicating (i) a private key for the new smart contract, the private key for the new smart contract being encrypted using a public key for the particular node, and (ii) an identity of the particular node;
applying, by the one or more processors, a digital signature of a node associated with the one or more processors to the transaction, the digital signature being generated based upon a second private key for a node associated with the one or more processors;
compiling, by the one or more processors, the transaction into a block of transactions; and
distributing, by the one or more processors, the block to the plurality of nodes to form a consensus on an update to the blockchain.

17. A computer system for providing access to confidential data stored in a blockchain, the blockchain relating to a plurality of smart contracts, the computer system comprising:
one or more processors;
a communication module adapted to communicate with a plurality of nodes;
a non-transitory program memory coupled to the one or more processors and storing executable instructions that, when executed by the one or more processors, cause the computer system to:
detect that a new smart contract has been created for inclusion in the plurality of smart contracts;
detect a request to provide a particular node access to encrypted data associated with the new smart contract, the request indicating the particular node;
determine that a permission level associated with the requesting node indicates that the requesting node is permitted to request that other nodes receive access to information associated with an insurance policy;
in response to the determination, generate a transaction indicating (i) a private key for the new smart contract, the private key for the new smart contract being encrypted using a public key for the particular node, and (ii) an identity of the particular node;
apply a digital signature to the transaction, the digital signature being generated based upon a second private key for a node associated with the one or more processors;
compile the transaction into a block of transactions; and
distribute, via the communication module, the block to the plurality of nodes to form a consensus on an update to the blockchain.

* * * * *